(12) United States Patent
Goodman et al.

(10) Patent No.: US 7,831,670 B2
(45) Date of Patent: *Nov. 9, 2010

(54) GUI INTERFACE FOR SUBSCRIBERS TO SUBSCRIBE TO TOPICS OF MESSAGES PUBLISHED BY A PUB/SUB SERVICE

(75) Inventors: Brian D. Goodman, New Haven, CT (US); Frank Jania, Norwalk, CT (US); Konrad C. Lagarde, Milford, CT (US); Chen Shu, Oakville, CT (US); Michael Van Der Meulen, Woodbridge, CT (US)

(73) Assignee: International Business Machines Corporation, Armonk, NY (US)

( * ) Notice: Subject to any disclaimer, the term of this patent is extended or adjusted under 35 U.S.C. 154(b) by 874 days.

This patent is subject to a terminal disclaimer.

(21) Appl. No.: 11/197,964

(22) Filed: Aug. 5, 2005

(65) Prior Publication Data

US 2005/0273499 A1    Dec. 8, 2005

Related U.S. Application Data

(62) Division of application No. 10/207,711, filed on Jul. 26, 2002.

(51) Int. Cl.
*G06F 15/16* (2006.01)
(52) U.S. Cl. .................. 709/206; 709/223; 709/220; 370/352; 707/10
(58) Field of Classification Search .............. 709/206, 709/220, 223; 370/352; 707/10
See application file for complete search history.

(56) References Cited

U.S. PATENT DOCUMENTS

| | | | |
|---|---|---|---|
| 5,636,344 A | 6/1997 | Lewis | 395/200.11 |
| 5,778,367 A | 7/1998 | Wesinger, Jr. et al. | 707/10 |
| 5,870,552 A | 2/1999 | Dozier et al. | 395/200.49 |
| 5,893,911 A | 4/1999 | Piskiel et al. | |
| 5,915,240 A | 6/1999 | Karpf | 705/2 |
| 6,018,716 A | 1/2000 | Denardo et al. | 705/7 |
| 6,018,730 A | 1/2000 | Nichols et al. | 706/45 |
| 6,028,601 A | 2/2000 | Machiraju et al. | 346/336 |
| 6,128,655 A | 10/2000 | Fields et al. | 709/219 |
| 6,138,120 A | 10/2000 | Gongwer et al. | 707/10 |

(Continued)

FOREIGN PATENT DOCUMENTS

EP    1130845 A2    9/2001

(Continued)

OTHER PUBLICATIONS

Microsoft Corporation (Microsoft), Internet Explorer 4.0 Accessibility, Oct. 1997.

(Continued)

*Primary Examiner*—Thanh Tammy Nguyen
(74) *Attorney, Agent, or Firm*—John E. Campbell; Floyd A. Gonzalez

(57) ABSTRACT

Presenting a Pub/Sub service GUI interface to a subscribers computer system, the GUI interface comprising one or more topics to which the subscriber can subscribe, the Pub/sub service having a list of subscribers subscribing to a topic. The GUI interface preferably comprising widgets, enabling a subscriber to manage subscriptions to topics. The Pub/Sub service publishes messages of a topic according to the subscription list.

27 Claims, 24 Drawing Sheets

U.S. PATENT DOCUMENTS

| | | | |
|---|---|---|---|
| 6,158,007 A | 12/2000 | Moreh et al. | |
| 6,185,603 B1 | 2/2001 | Henderson et al. | |
| 6,209,100 B1 | 3/2001 | Robertson et al. | |
| 6,223,165 B1 | 4/2001 | Lauffer | 705/8 |
| 6,226,359 B1 | 5/2001 | Montgomery et al. | |
| 6,236,991 B1 | 5/2001 | Frauenhofer et al. | 706/6 |
| 6,268,856 B1 | 7/2001 | Bruck et al. | 345/357 |
| 6,286,001 B1 | 9/2001 | Walker et al. | |
| 6,324,587 B1 | 11/2001 | Trenbeath et al. | 709/310 |
| 6,341,960 B1 | 1/2002 | Frasson et al. | 434/322 |
| 6,421,709 B1 | 7/2002 | McCormick et al. | |
| 6,442,529 B1 | 8/2002 | Krishan et al. | 705/14 |
| 6,442,590 B1 | 8/2002 | Inala et al. | |
| 6,477,708 B1 | 11/2002 | Sawa | |
| 6,496,851 B1 | 12/2002 | Morris | 709/204 |
| 6,535,586 B1 | 3/2003 | Cloutier et al. | 379/88.13 |
| 6,539,421 B1 | 3/2003 | Appelman et al. | 709/206 |
| 6,574,658 B1 | 6/2003 | Gabber et al. | |
| 6,587,668 B1 | 7/2003 | Miller et al. | |
| 6,609,103 B1 | 8/2003 | Kolls | |
| 6,651,086 B1 | 11/2003 | Manber et al. | |
| 6,732,101 B1 | 5/2004 | Cook | 707/10 |
| 6,771,154 B1 | 8/2004 | Funayama et al. | 335/159 |
| 6,807,675 B1 | 10/2004 | Maillard et al. | 725/35 |
| 6,832,245 B1 | 12/2004 | Isaacs et al. | 709/206 |
| 6,941,345 B1 | 9/2005 | Kapil et al. | 709/206 |
| 6,981,223 B2 | 12/2005 | Becker et al. | |
| 6,993,564 B2 | 1/2006 | Whitten, II | |
| 7,017,175 B2 * | 3/2006 | Alao et al. | 725/105 |
| 7,124,167 B1 | 10/2006 | Bellotti et al. | |
| 7,152,094 B1 | 12/2006 | Jannu et al. | |
| 7,155,475 B2 | 12/2006 | Agnoli et al. | |
| 7,194,004 B1 | 3/2007 | Thomsen | |
| 7,209,964 B2 * | 4/2007 | Dugan et al. | 709/223 |
| 7,319,882 B2 | 1/2008 | Mandiola et al. | |
| 7,539,763 B2 | 5/2009 | Toyota et al. | |
| 2001/0034015 A1 | 10/2001 | Raichur et al. | |
| 2001/0049721 A1 | 12/2001 | Blair et al. | |
| 2001/0056422 A1 * | 12/2001 | Benedict et al. | 707/10 |
| 2002/0007453 A1 | 1/2002 | Nemovicher | |
| 2002/0023131 A1 | 2/2002 | Wu et al. | 709/205 |
| 2002/0040374 A1 * | 4/2002 | Kent | 707/516 |
| 2002/0062391 A1 | 5/2002 | Densmore | |
| 2002/0072039 A1 | 6/2002 | Rtischev et al. | |
| 2002/0099777 A1 | 7/2002 | Gupta et al. | |
| 2002/0131407 A1 | 9/2002 | Muhonen | |
| 2002/0133534 A1 * | 9/2002 | Forslow | 709/200 |
| 2002/0138588 A1 | 9/2002 | Leeds | |
| 2003/0023692 A1 | 1/2003 | Moroo | |
| 2003/0028525 A1 | 2/2003 | Santos et al. | |
| 2003/0061365 A1 | 3/2003 | White et al. | |
| 2003/0065805 A1 | 4/2003 | Barnes, Jr. | |
| 2003/0108543 A1 | 6/2003 | Lewandowski | |
| 2003/0131073 A1 | 7/2003 | Lucovsky et al. | |
| 2003/0158913 A1 | 8/2003 | Agnoli et al. | |
| 2003/0208543 A1 | 11/2003 | Enete et al. | 709/206 |
| 2003/0212800 A1 | 11/2003 | Jones et al. | |
| 2003/0217105 A1 | 11/2003 | Zircher | |
| 2003/0220872 A1 | 11/2003 | Montet et al. | |
| 2004/0002049 A1 | 1/2004 | Beavers et al. | |
| 2004/0015554 A1 | 1/2004 | Wilson | |
| 2004/0080534 A1 | 4/2004 | Quach | |

FOREIGN PATENT DOCUMENTS

| | | |
|---|---|---|
| EP | 1365553 A1 | 11/2003 |
| WO | WO00/077661 A | 12/2000 |

OTHER PUBLICATIONS

Patel, D, Office Actions dated Dec. 24, 2009 for U.S. Appl. No. 10/207,685 filed Jul. 26, 2002.

Patel, D, Office Action dated Dec. 10, 2009 for U.S. Appl. No. 11/234,987 filed Sep. 26, 2005.

Patel, Dhairya A, Final Action dated Feb. 22, 2010 for U.S. Appl. No. 10/730,227 filed Dec. 8, 2003.

* cited by examiner

MESSAGE CONTENT FILTERING

GUI INTERFACE FOR SUBSCRIBERS TO SUBSCRIBE TO TOPICS OF MESSAGES PUBLISHED BY A PUB/SUB SERVICE

CROSS-REFERENCE TO RELATED APPLICATION

This is a divisional application of Ser. No. 10/207,711 "INTERACTIVE FILTERING ELECTRONIC MESSAGES RECEIVED FROM A PUBLICATION/SUBSCRIPTION SERVICE" filed on Jul. 26, 2002 and assigned to IBM. The disclosure of the forgoing application is incorporated herein by reference.

COPYRIGHT NOTICE

A portion of the disclosure of this patent document contains material which is subject to copyright protection. The copyright owner has no objection to the facsimile reproduction by anyone of the Patent and Trademark Office patent file or records, but otherwise reserves all copyright rights whatsoever.

FIELD OF THE INVENTION

The present invention is related to systems and methods for Publication/Subscription, more particularly to systems and methods for distributed computer users to securely subscribe and publish by way of a Pub/Sub channel.

BACKGROUND OF THE INVENTION

FIG. 1 depicts the elements that make up a typical computer for use in presenting and maintaining an application. The computer 100 consists of a Base Computer 101 which comprises a processor 106, storage media such as a magnetic disk 107 and a high speed volatile main memory 105. An operating system and application programs 111 reside on the storage media 107 and are paged into main memory 105 as needed for computations performed by the processor 106. The Base computer may include optional peripheral devices including a video display 102, a printer or scanner 110, a keyboard 104, a pointing device (mouse) 103 and a connection 108 to a network 109. In a client environment, a user will interact with a (Graphical User Interface) GUI by use of a keyboard 104 and mouse 103 in conjunction with the display of information on the display 102 under control of an application program (application 1) 112. The client application program 112 will then interact with remote users by way of the network 109.

In FIG. 2 an example Internet system is shown. A user at client 1 201 uses applications on his system. This user (user 1 210) at client 1 201 can interact with clients 2-4 202-204 by way of a client server computer 206. Applications 112 may be provided by each client 201-205 and or the client server 206 or some remote server 208 by way of the network 207. The user at client 1 201 can interact with a remote user (user 5 211) at client 5 205 by way of the Internet 207.

Recently, peer to peer (P2P) interconnection has become an interesting alternative. FIG. 3 shows an example P2P network 300 wherein peer 1 301 can communicate with other peers directly. Each peer essentially includes client and server function. Thus, Peer 1 301 acts as a client in sending messages to Peer 2 302. Peer 2 performs some function as a result of receiving the message and may return a message to peer 1. Thus, peer 2 302 acts as a server for peer 1 301. P2P grids provide networked computers that cooperate to perform distributed computing.

Networked clients comprise applications for communication. E-mail applications provide for sending a message to a mail server that then makes the recipient aware of the waiting message. The recipient then can elect to open the message and view it at his client machine. E-mail messages can be sent to a single recipient or can contain a list of several recipients (one to many). One to many e-mail transactions are popular with advertisers and the use of one to many e-mails has been dubbed "SPAM-ing". Recently Instant Messaging (IM) has gained popularity in the form of sending text messages directly to another client. A first user composes an IM and selects a second user as the target. A message is then sent directly to the second user and appears on his display as either a message or the notification of a message. IMs are typical one to one messages.

Refer now to FIG. 4 which depicts a logical view of a pub/sub system of the prior art. A pub/sub service 404 receives messages originating from a content service 401-403 and delivers them to client subscribers 405 406. An example message published includes a topic string, a set of property name-value pairs, and a body. A subscriber identifies a topic string pattern and properties test, and receives matching messages according to a standard, for instance JAVA Message Service (JMS).

The pub/sub system is made up of a Content Provider application (Service) 401-403, the Subscriber (Client) 405-406, and the Pub-Sub Service 404. Applications may implement one or more of these roles. The content provider 401-403 generates content for distribution through the pub/sub system 400. Content providers 401-403 send structured content to one or more instances of the pub/sub service 404. The subscriber 405-406 sends subscription requests 407 to an instance of the pub/sub service 404 and, subject to acceptance of a particular subscription request, receives content 408 from the pub/sub service. The actual content received will be determined by the subscription and the message selection process.

The pub/sub service 404 acts as both a subscription manager 410 and a content distribution agent 411. Applications implementing the pub/sub service role 404 accept subscription requests 407 from subscribers 405 and, subject to any applicable authentication or access control policies, accept or reject subscription requests; and distribute content 408 to valid subscribers 405.

The actual content sent to each subscriber 405-406 by the pub-sub service 404 will be determined by the subscription process 410 and through the message selection process 411.

Applications implementing some aspect of the pub/sub system may act in different roles in different circumstances. For example, an application implementing the pub/sub service role 404 may itself act as a subscriber, subscribing to and receiving content from another instance of the pub-sub service. Similarly, an application acting in the subscriber role may act as a content producer if the end-user of the application wishes to publish a message to the service.

The pub/sub system provides for communication among applications implementing the application roles. There are two primary communications in the pub/sub system: messages are sent from content providers to pub/sub services; and pub/sub services send messages to subscribers 408, 412.

Content providers 401-403 may generate messages from any content source, and subscribers may dispose of messages in any manner they choose. For example, a content provider may simply be a gateway between a raw content source, such as e-mail or web pages, to the pub-sub service. Similarly, a subscriber 405, 406 may act as a gateway between the pub-sub service and an external service such as NNTP or e-mail.

An application implementing a particular role defined in the Pub/Sub System may implement different roles at different times.

For example, an application implementing the pub/sub service role 404 may itself act as a subscriber, subscribing to content through another instance of the pub-sub service and receiving messages from that service.

SUMMARY OF THE INVENTION

The present invention (Shotgun) teaches a system for publishing electronic information by way of channels. A user subscribes to a "channel" of information similarly to selecting a Television Channel. Messages of information broadcast from that channel are then directed to the subscriber application which comprises filtering mechanisms to selectively permit messages to be passed on to the shotgun client user. The system maintains a database directory of applications, accessed through an administrative SOAP service. The directory contains security information, channel access controls, owner identification, help text and the like.

Publish/subscribe systems contain information producers and information consumers. Information producers publish events to the system, and information consumers subscribe to particular categories of events within the system. The "system" ensures the timely delivery of published events to all interested subscribers. In addition to supporting many-to-many communication, the primary requirement met by publish/subscribe systems is that producers and consumers of messages are anonymous to each other, so that the number of publishers and subscribers may dynamically change, and individual publishers and subscribers may evolve without disrupting the entire system.

The earliest publish/subscribe systems were subject-based. In these systems, each message belongs to one of a fixed set of subjects (also known as groups, channels, or topics). Publishers are required to label each message with a subject; consumers subscribe to all the messages within a particular subject. For example a subject-based publish/subscribe system for stock trading may define a group for each stock issue; publishers may post information to the appropriate group, and subscribers may subscribe to information regarding any issue.

In an embodiment, secure publication and subscription is provided in a system having a pub/sub server having one or more channels, the method comprising the steps of: Providing first subscription access capability to a group channel the first subscription access requiring user authorization; Providing second subscription access capability to a public channel wherein the second subscription access is universally authorized.

In another embodiment, a method is provided for invoking a first client application in a system wherein the system includes a pub/sub server and a second client application, the method comprising the steps of: Subscribing to a channel of a pub/sub server; Receiving a message for invoking the first client application at the second client application from the pub/sub server; and Invoking the first client application using information supplied by the message.

In another embodiment, a method is provided for dynamic management of pub/sub user applications by a user, the method comprising the steps of: Creating a list of pub/sub user applications available to a user; Using the list of user applications to create a GUI interface to a user, the GUI interface comprising at least one of a first user application identifier, an activate first user application function, a deactivate first user application function, a first user application active indicator or a method for displaying information about the first user application.

In one version, the optional step of subscribing to the first user application uses the GUI interface.

Another version comprises the step of performing an authorization action in conjunction with the list in order to permit a user application to appear on the GUI interface to the user.

In still another version, the subscribing step further comprises the step of permitting subscribing to the first user application only when the user is authorized.

It is therefore an object of the present to create a GUI representation for presenting message topics to subscribers to a pub/sub system.

It is another object of the present invention to present the GUI representation to subscribers to a pub/sub system.

It is still a further object of the present invention to associate a list of subscribers with a topic of the GUI representation, the list of subscribers authorized to receive pub/sub messages related to the topic.

It is a further object of the present invention to incorporate in the GUI representation, one or more widgets, a widget comprising any one of a topic activate function, a topic deactivate function, a topic active indicator, a function to cause details of a topic to be displayed, a function to request subscription to a topic, a function to add a topic, a function to remove a topic, a function to authorize subscription to a topic or a function to authorize the addition of a topic.

It is another object of the present invention to provide the GUI representation to a subscriber computer system by way of an application program at the subscriber computer system.

It is another object of the present invention to provide GUI representation widgets that perform a function in response to the received widget message, the function comprising any one of activating a topic at the first subscriber computer system, deactivating a topic at the first subscriber computer system, indicating at the first subscriber computer system that a topic is active, indicating at the first subscriber computer system that a topic is inactive, displaying details of a topic at the first subscriber computer system, granting subscription to a topic for the first subscriber, adding a topic to the GUI representation at the first subscriber computer system, removing a topic from the GUI representation at the first subscriber computer system, authorizing a subscription to a topic or authorizing addition of a topic to the GUI representation.

It is another object of the present invention to provide a means for authorizing and authenticating subscribers to be added to the list of subscribers.

It is another object of the present invention to provide a means for adding topics to the GUI representation.

The above as well as additional objectives, features, and advantages of the present invention will become apparent in the following written description.

DESCRIPTION OF THE PREFERRED EMBODIMENTS

The present invention provides a method for publishing electronic messages by way of channels in a pub/sub server system wherein subscription to applications and channels is provided by way of a secure GUI application. The example system employing the present invention is herein called "Shotgun".

In a preferred embodiment, Shotgun comprises a Shotgun server application and a Shotgun client application. The Shotgun server application comprises:

1. A Pub/Sub component for broadcasting content provided by a Provider Service application.
2. A publisher security component for supporting and authenticating the Provider Service application for publication of content.
4. A subscriber security component for supporting and authenticating a subscriber.
5. An optional subscriber customization component that, in cooperation with a subscriber, customizes activity associated with the subscriber such as filtering broadcast content based on topic, topic tags or message content and the like.

A Shotgun client application resides on the client machine. The Shotgun client application provides:

1. Communication with the Shotgun Server application.
2. GUI interface for a subscriber to: subscribe to a service; supply credentials to the Shotgun server application; and customize information transmitted and received from the Shotgun Server application and/or agent applications.
3. An optional API interface for attaching agent applications.

Figure 1:
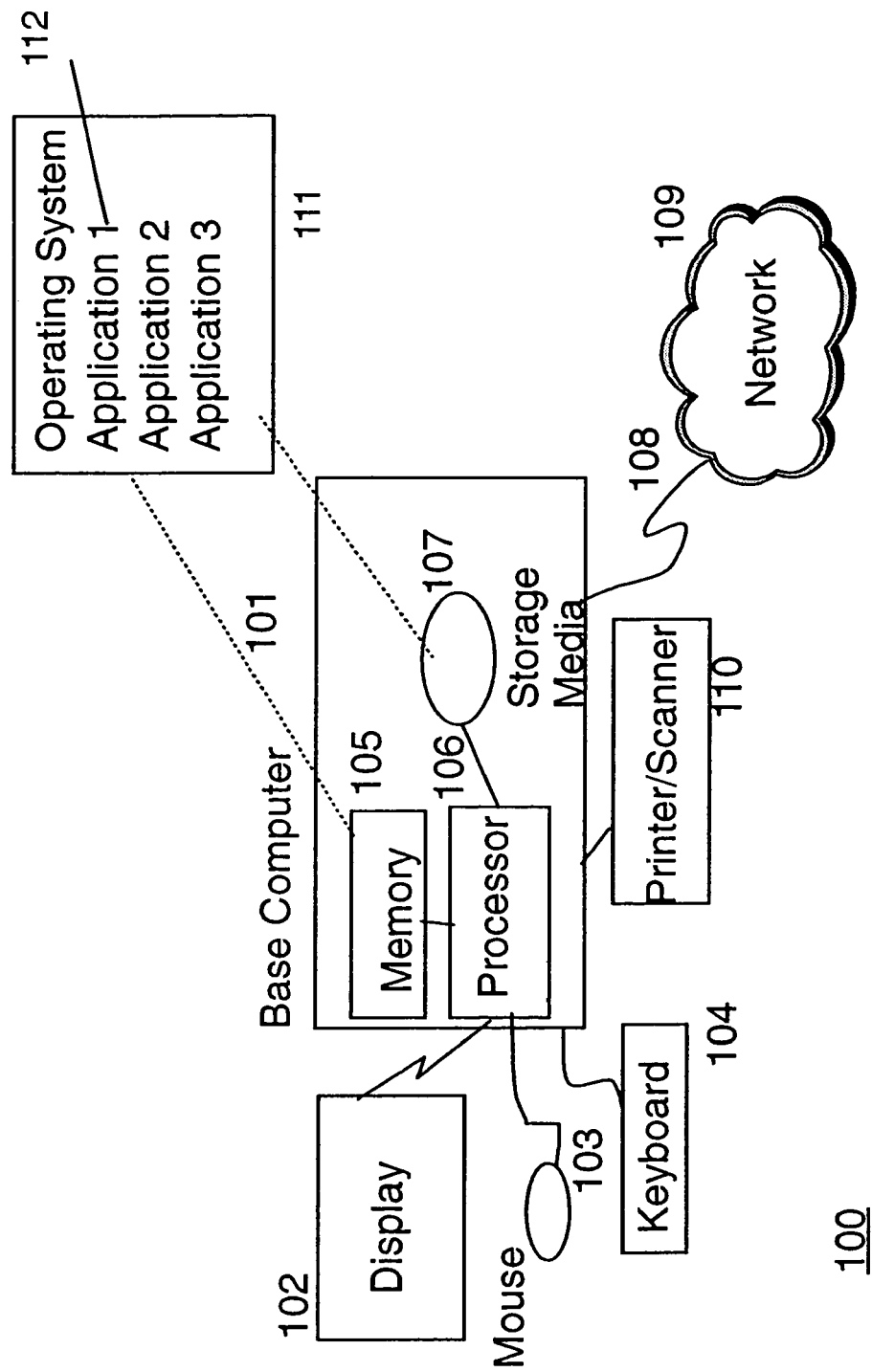
FIG. 1 is a diagram depicting example components of a computer system.
Figure 2:
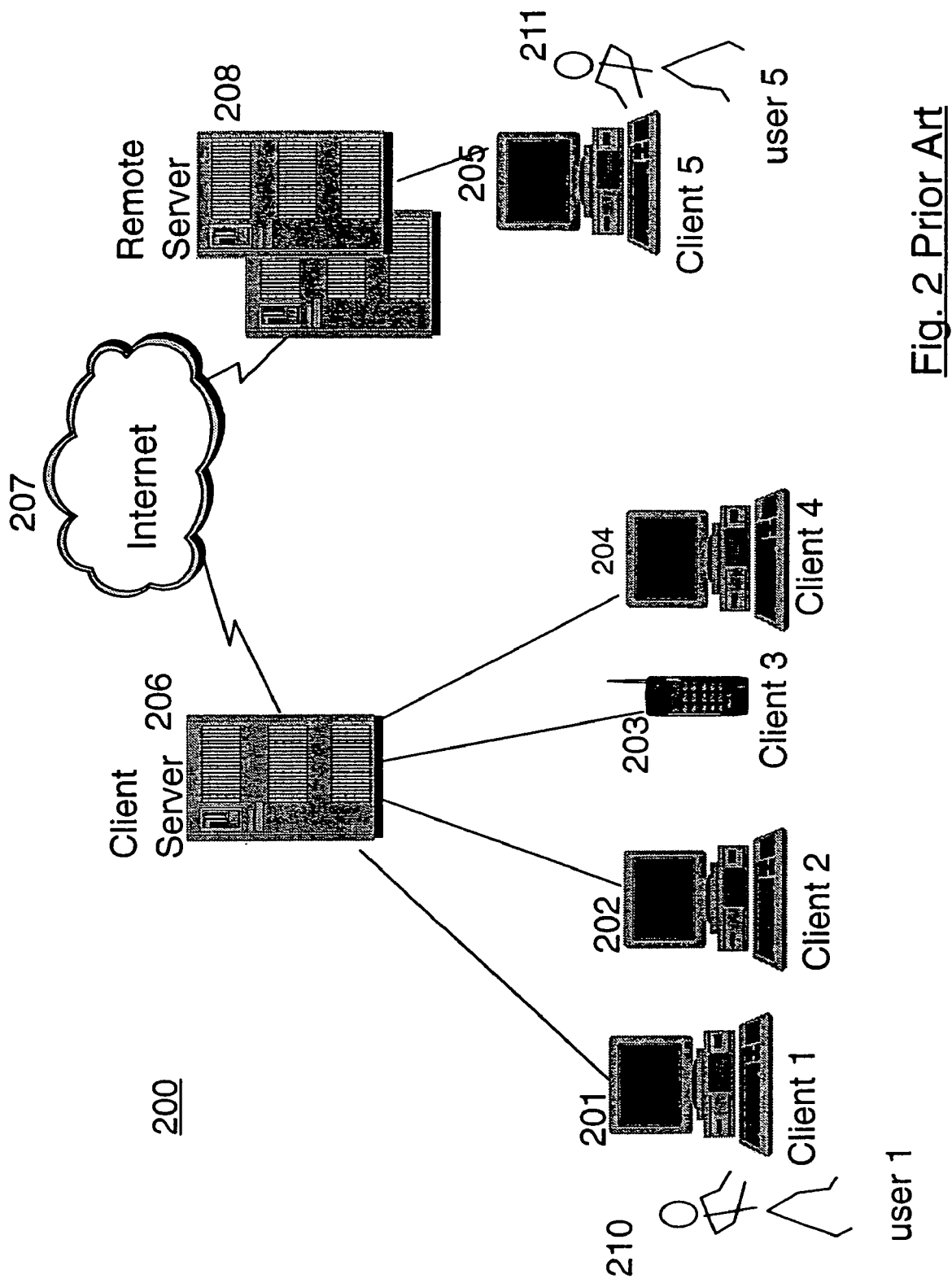
FIG. 2 is a diagram depicting example components of a client-server network.
Figure 3:
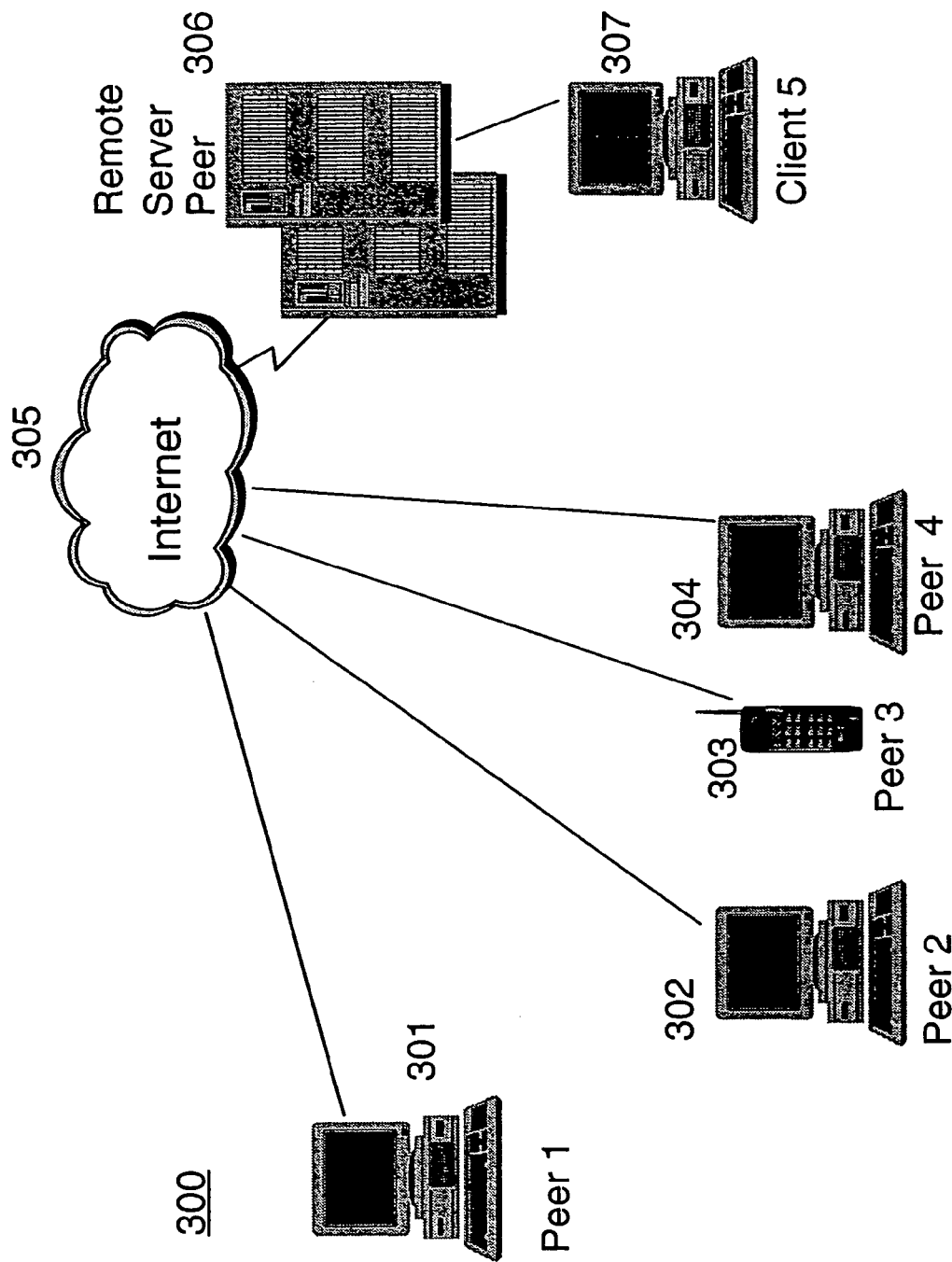
FIG. 3 is a diagram depicting example components of a Peer-to-peer network.
Figure 4:
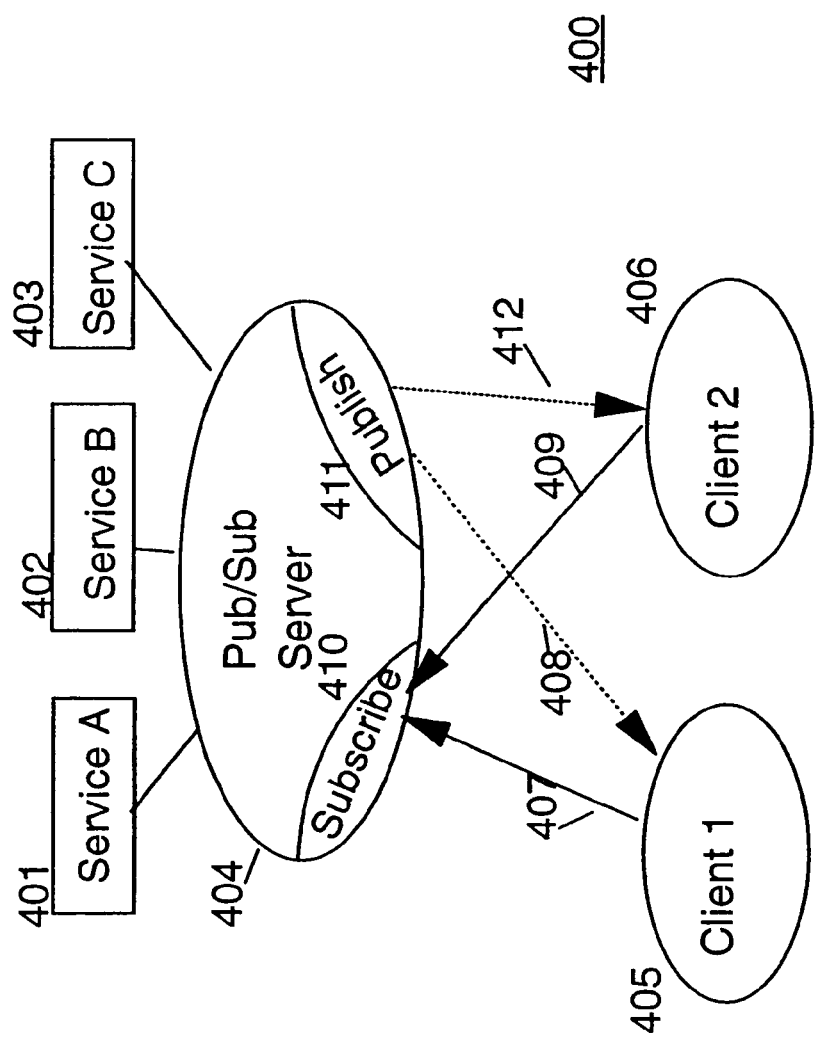
FIG. 4 depicts logical components of a pub/sub system.
Figure 5:
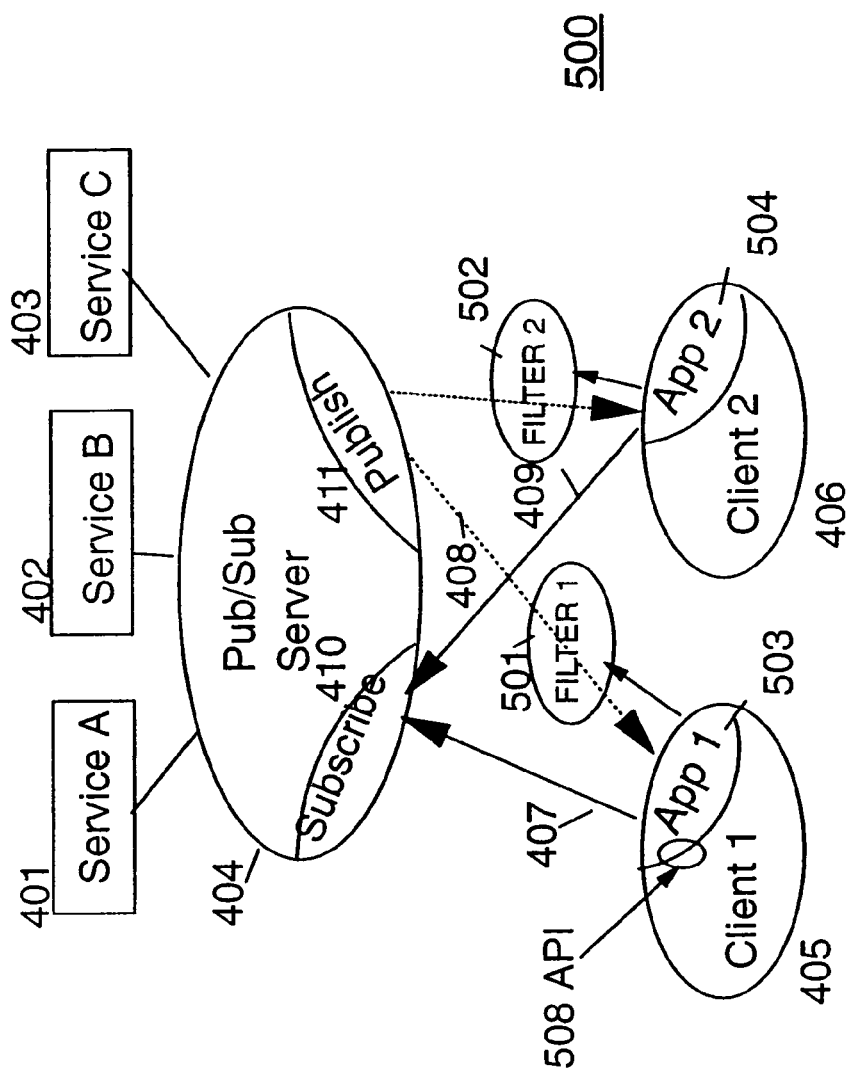
FIG. 5 depicts logical components of a pub/sub system of the present invention.

FIG. 5 shows the system of the prior art of FIG. 4 with a conceptual diagram of one aspect of the present invention added. Shotgun introduces channel and message filtering into a pub/sub environment 404. A Service 401-403 may provide information by way of "channels" to many subscribers by way of the pub/sub service 404. Channels provide a way for services to partition functionality, thus a Stock Brokering service may provide a channel for stock quotes, and another channel for company profile information.

In a preferred embodiment, a channel is a "topic" field appended to a message. The topic may have sub-topic fields associated with it as well. When a subscriber subscribes to a channel of a service, the pub/sub service publishes messages having the selected topic field to the subscriber. Shotgun further provides a filter mechanism to permit the user to define the sub-topics that he is interested in. Shotgun will only publish to the subscriber, messages having topics and sub-topics according to the subscriber's selection.

Shotgun provides a mechanism for allowing a subscriber to subscribe to a service 401-403 and to a channel provided by the service. Shotgun also provides a mechanism to allow a user to create filters on channels and message content (message identifying information) published by the pub/sub service such that only selected channel messages (those messages containing identifying information in accordance with predetermined inspection criteria) are received by the user. Thus, a user can create a channel filter to receive only stock quote messages and a message filter to only receive messages that include IBM stock.

Services A-C 401-403 are available by subscription. Clients 1 and 2 405-406 comprise Applications 1 and 2 respectively 503-504. A user at Client 1 405 subscribes by way of Pub/Sub server 404 to Service B 402. The user performs the Subscription operation using a GUI interface described later herein. Service B 402 sends messages to subscribers by way of Pub/Sub Server 404. Messages are filtered 501-502 by examining the content of the message body for keywords, boolean compares or other methods well known in the art. The filtering criteria is pre-programed by the user of client 1 405 such that only messages containing information of interest to the user appear at the user's display. Shotgun Application 1 503 controls the filtering criteria but the actual filtering may be done at the pub/sub server in one embodiment or on the client's 405 machine (App 1 503) in another embodiment. Content filtering is performed on the incoming messages based on key words or more complex boolean tests, depending on the implementation. In one embodiment, the user is alerted when a message is available (has passed the filter test) and can elect to receive the full message or discard it.

Subscription to a service 401-403 persists as long as the shotgun client application is active or can be maintained based on other criteria such as elapsed time or specific user actions (on/off selection for example). In a preferred embodiment, the user optionally enables the Shotgun client application to save subscriber information locally and use it to automatically subscribe to predetermined services with predetermined filtering whenever the client is activated (power on).

In a preferred embodiment, shotgun client applications 503-504 include an application program interface (API) 508 providing an interface so that adjunct applications can be provided to the shotgun client applications 503-504. This provides similar functionality to application plug-ins used to extend Web Browser functionality in a Web environment. In a preferred embodiment, an instant messaging (IM) application is provided during a session such that clients can communicate with one another using IM facilities.

In another preferred embodiment, the shotgun client application 503-504 provides a user API 508 enabling a third party application to be plugged into the shotgun client application.

Figure 6:
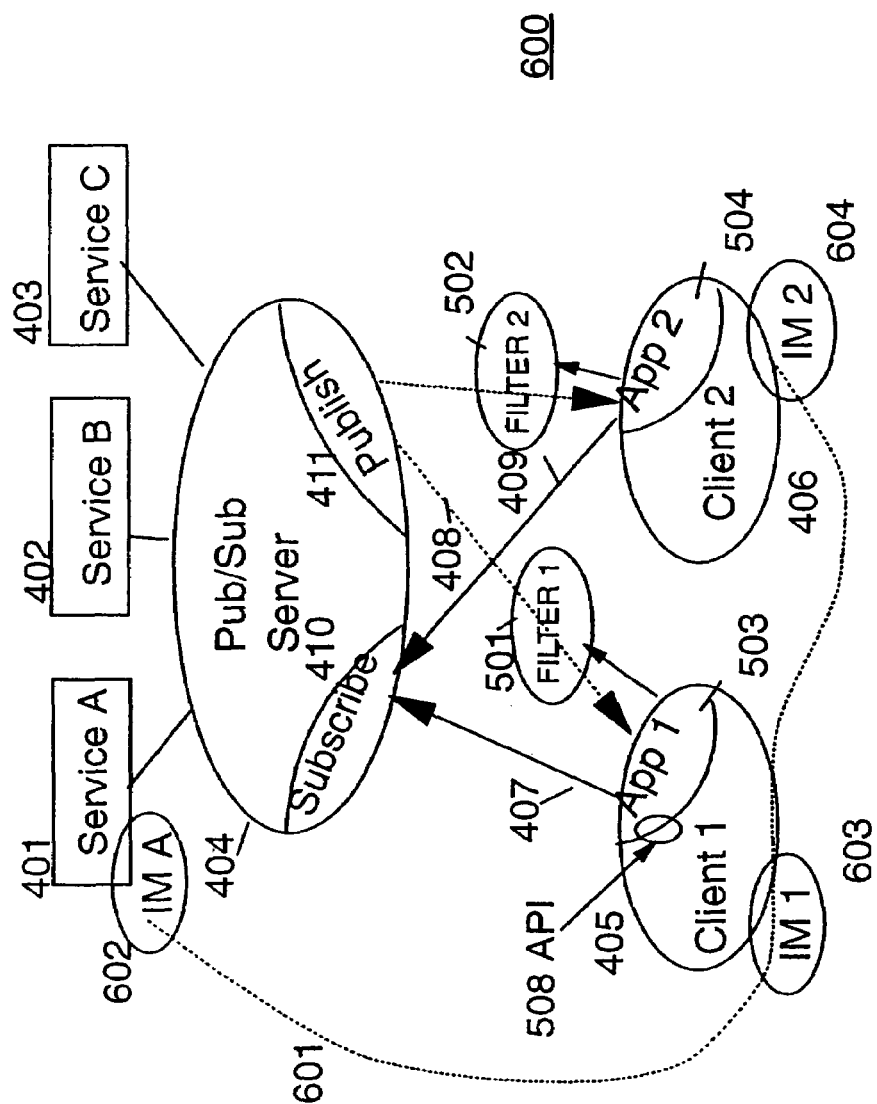
FIG. 6 depicts logical components of a pub/sub system incorporating Instant Messaging of the present invention.

In another preferred embodiment, reference FIG. 6, Client 1 405 subscribes to Service A 401 by way of the pub/sub server 404. Service A provides an active agent IM A 602 which interfaces to the system acting like a user. IM A 602 has an IM address (which it supplies to it's subscribers) and subscribers can communicate with Service A 401 using IM facilities.

using the embodiment above, a shotgun client can receive information from Service A and communicate with other users or Service A as if Service A were another user (client) by way of IM.

Shotgun automates the security mechanism for controlling who can publish data and on what channels. Shotgun maintains a database directory of applications, accessed through an administrative SOAP service. (SOAP is a lightweight XML based protocol for exchange of information in a decentralized, distributed environment. It includes an envelope that defines a framework for describing what is in a message and how to process it and transport binding framework for exchanging messages using an underlying protocol.) The directory of applications contains channel access controls, owner identification, help text and other application parameters.

The shotgun infrastructure revolves around a publish and subscribe (pub/sub) service. In a preferred embodiment it is an IBM WEBSPHERE service called "MQ Publish & Subscribe". Any pub/sub application could be used to create a Shotgun service as taught by the present application. The WEBSPHERE service adds Enterprise level of security on top of a common broadcast component. The LDAP (Lightweight Directory Access Protocol) directory provides authentication and a grouping technology provides authorization. The application registration provides an additional level of authorization on top of the free form Corporate architecture.

LDAP is a well known directory service protocol that runs over TCP/IP. LDAP provides a method for a client to authenticate or prove its identity to a directory server to help protect the information the server contains.

Secure Publisher Preferred Embodiment (WebService Interface):

Security (authentication/Authorization) for the publisher is provided by a private LDAP Directory, an application registration database or any appropriate authorization technique. The publisher preferably uses a Web Service SOAP interface and calls the pub/sub service by providing topic (channel), message, user ID and password over HTTPS secure socket. Alternatively, the publisher calls the pub/sub service by providing topic (channel) and message over HTTPS wherein the user name and password are stored in the HTTP specified REMOTE_USER field.

Gryphon functionality is available in IBM WEBSPHERE available from INTERNATIONAL BUSINESS MACHINES particularly in the component IBM WEBSPHERE MQEVENT BROKER also available from INTERNATIONAL BUSINESS MACHINES, Gryphon provides a new alternative to subject-based systems is content-based messaging systems. Functionality associated with Gryphon can be found in the following US patents: U.S. Pat. No. 6,216,132 "METHOD AND SYSTEM FOR MATCHING CONSUMERS TO EVENTS" (Chandra et al.); U.S. Pat. No. 6,091,724 "ROUTING MESSAGES WITHIN A NETWORK USING THE DATA CONTENT OF THE MESSAGE" (Chandra et al.); U.S. Pat. No. 6,336,119 "METHOD AND SYSTEM FOR APPLYING CLUSTER-BASED GROUP MULTICAST TO CONTENT-BASED PUBLISH-SUBSCRIBE SYSTEM" (Banavar et al.). Each of these patents is assigned to INTERNATIONAL BUSINESS MACHINES and incorporated herein by reference.

A significant restriction with subject-based publish/subscribe is that the selectivity of subscriptions is limited to the predefined subjects. Content-based systems support a number of information spaces, where subscribers may express a "query" against the content of messages published.

The Gryphon system provides content-based publish/subscribe functionality. Clients access the system through an implementation of the Java Message Service (JMS) API. The Gryphon message broker is scalable, available, and secure:

Scalability: Brokers may be added into the network to provide support for additional clients. The configuration support is flexible enough to efficiently support geographic distribution of brokers. Server farms in multiple geographies may be linked through a number of explicit links rather than requiring NxN connectivity between all brokers.

Availability: Gryphon responds to the failure of one broker in a network by rerouting traffic around the failed broker. Reconfiguration is automatic and requires no intervention by an administrator.

Security: Gryphon supports access controls for limiting who may publish and subscribe to portions of the information space. Further, Gryphon currently supports four authentication mechanisms for verifying client identity: simple password (e.g. telnet), mutual secure password authentication (password is never sent over the wire), asymmetric SSL (password sent over a secure SSL connection to the server) and symmetric SSL (both client and server use certificates to authenticate each other). Secrecy and integrity of sensitive messages are protected through state-of-the-art encryption mechanisms.

Gryphon is a distributed computing paradigm for message brokering, which is the transferring of information in the form of streams of events from information providers to information consumers.

In Gryphon, the flow of streams of events is described via an information flow graph. The information flow graph specifies the selective delivery of events, the transformation of events, and the generation of derived events as a function of states computed from event histories.

Message brokering is motivated by the need for efficient delivery of information across a large number of users and applications, in an environment characterized by heterogeneity of computing platforms, anonymity between information producers and consumers, and dynamic change due to system evolution. Within a single business, such as a stock exchange or a weather forecasting agency, there is a dynamically varying number of sub-applications supplying events, and a varying number consuming events. The suppliers and consumers may not necessarily be aware of one another; instead the suppliers may simply be supplying information of a certain type to any interested consumer and each consumer may be interested in subsets of this information having particular properties. For example, in a stock exchange, one consumer may be interested in all stock trades greater than 1000 shares, and another in specific market trends, such as all stock trades representing a drop of more than 10 points from the previous day's high.

There is also a growing need to "glue" together applications within multiple businesses, to support inter-business network commerce or maybe as a result of mergers and acquisitions. For example, a retailer may need to connect to its suppliers and customers, or a customer to various retailers and financial organizations. This may require transforming events from different sources into a compatible form, merging them, and selecting from these events.

Message brokering is an extension of publish-subscribe technology. The Gryphon approach augments the publish-subscribe paradigm with the following features:

1. Content-based subscription, in which events are selected by predicates on their content rather than by pre-assigned subject categories;
2. Event transformations, which convert events by projecting and applying functions to data in events;
3. Event stream interpretation, which allows sequences of events to be collapsed to a state and/or expanded back to a new sequence of events; and
4. Reflection, which allows system management through meta-events.

Gryphon technology includes a collection of efficient implementations to support this paradigm and still provide scalability, high throughput and low latency.

The Gryphon Model

As mentioned earlier, event processing in Gryphon is described via an information flow graph. An information flow graph is a directed acyclic graph constituting an abstraction of the flow of events in the system. In one example, stock trades from two information sources, NYSE and NASDAQ, are combined, transformed, filtered and delivered to a client. The two sources produce events of type (price, volume), which are merged into a single stream. A path computes a new stream of events of type, and another path filters out events with capital less than $1,000,000.

A Gryphon information flow graph is an abstraction because Gryphon is free to physically implement the flow any way it chooses, possibly radically altering the flow pattern, provided that the consumers see the appropriate streams of events consistent with the incoming events and the transformations specified by the graph. Gryphon optimizes graphs and deploys them over a network of brokers (or servers). The broker network is responsible for handling client connections and for distributing events.

The nodes of the graph are called information spaces. spaces are either 1. event histories—monotonically growing collections of events, e.g., stock trade events of the form (price, volume), or 2. event interpretations—states representing interpretations of sequences of events, such as a table (latestprice, highestprice). Each information space has a schema defining the structure of the history or state it contains. Each arc (path) in the information flow graph defines an operation to derive the information space at the head from that at the tail. Arcs can be one of the following types:

"select (P)" specifies that the destination event history contains the subset of events in the source event history that satisfy the predicate P. The two event histories have the same schema.

"transform (T)" specifies that each event in the destination event history is obtained by applying function T to the corresponding event in the source event history.

"merge" combines two or more event histories of the same schema into a single history. This operation is implicit when multiple arcs lead to the same information space.

"interpret (I)" converts a source event history to a destination state by applying an interpretation function I to the history. Each time a new event arrives, this interpretation will be (incrementally) re-evaluated.

"expand (I)" The inversion of interpret: converts a state to an event history which is equivalent to that state under function I. This is a non-deterministic function: in particular, interpreting an event history and re-expanding it with the same I may yield the identical event history, but may also yield a different history which yields an equivalent state under I.

The Gryphon system consists of several components for efficiently realizing the information flow graph over a large distributed network of brokers. Areas of interest include:

Event matching—determining, for each event, the subset of N subscriptions that match the event.

Multicasting—routing the events from source to all destinations while avoiding unnecessary processing of messages at brokers and long message headers on events. Multicast techniques in the prior art use the concept of groups, and do not apply to content-based pub/sub systems.

Graph transformations—reordering the selects, transforms, and interpretations to minimize the number of events sent through the network and the load on the brokers.

Fault-tolerance—preserving the appearance of a persistent information flow graph in the presence of failures. In addition, guaranteeing that, when required, clients have consistent views of information spaces even in the presence of failure so that some clients don't see that an information space contains a message while others see that the same information space has lost the message.

Ordered delivery—guaranteeing that, when required, clients have consistent view of the order of events in an information space.

Optimistic delivery—when a client's view of an information space is through an interpretation, exploits the non-determinism of the equivalent state to deliver messages to the client early, out-of-order, or to drop messages.

Compression—when a client's view of an information space is through an interpretation and the client disconnects and reconnects, exploits the non-determinism of the equivalent state to deliver a compressed sequence of events that captures the same state.

Reconfiguration—allows the physical broker network to be dynamically updated and extended without disturbing the logical view of a persistent information flow graph.

Reflection—capturing events corresponding to requests to change the information flow graph, and confirmed changes to the information flow graph in a special meta-event space.

Security—dealing with issues concerning the lack of full mutual trust between domains in the physical broker network.

Figure 7:
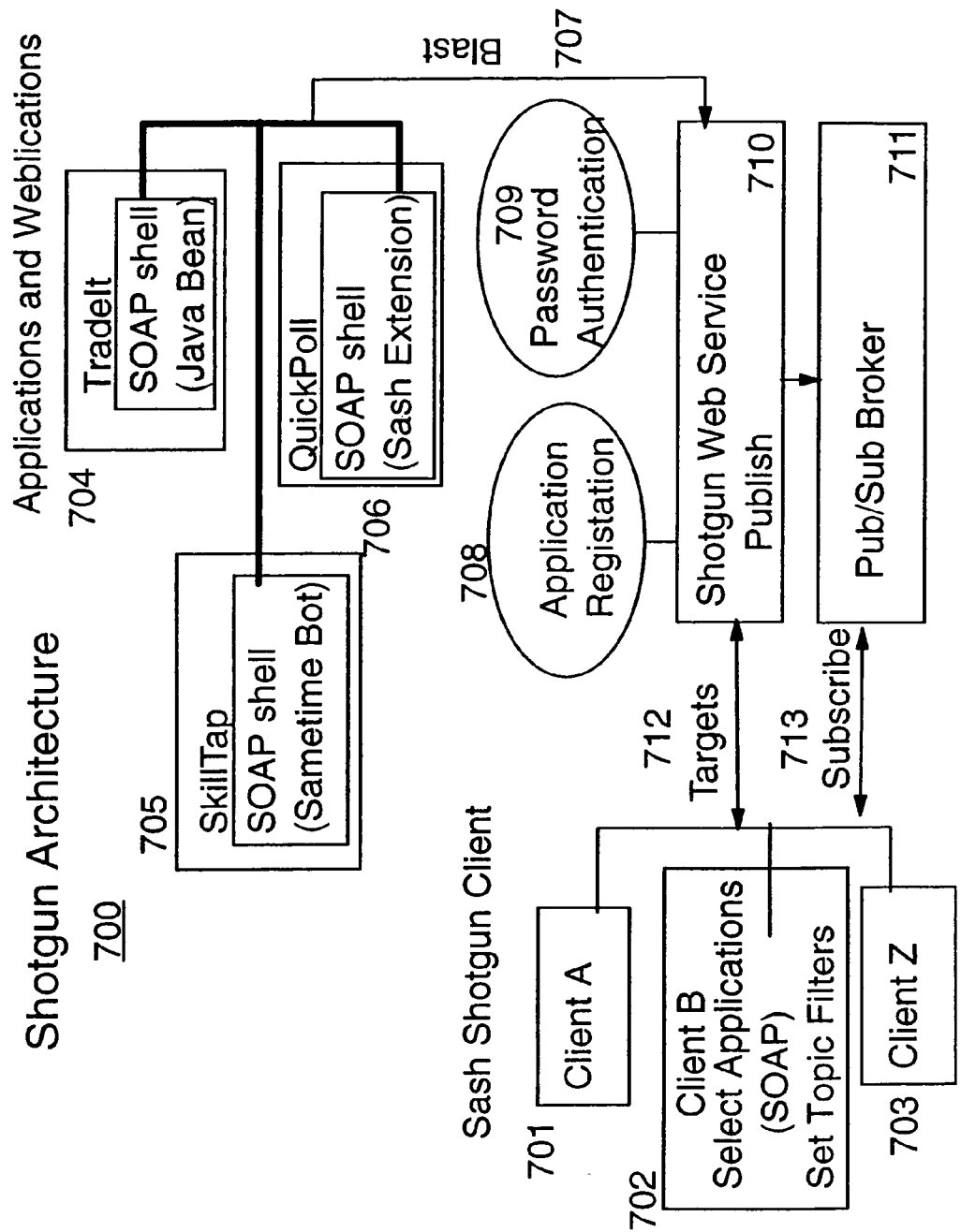
FIG. 7 depicts a preferred embodiment of the present invention.
Figure 8:
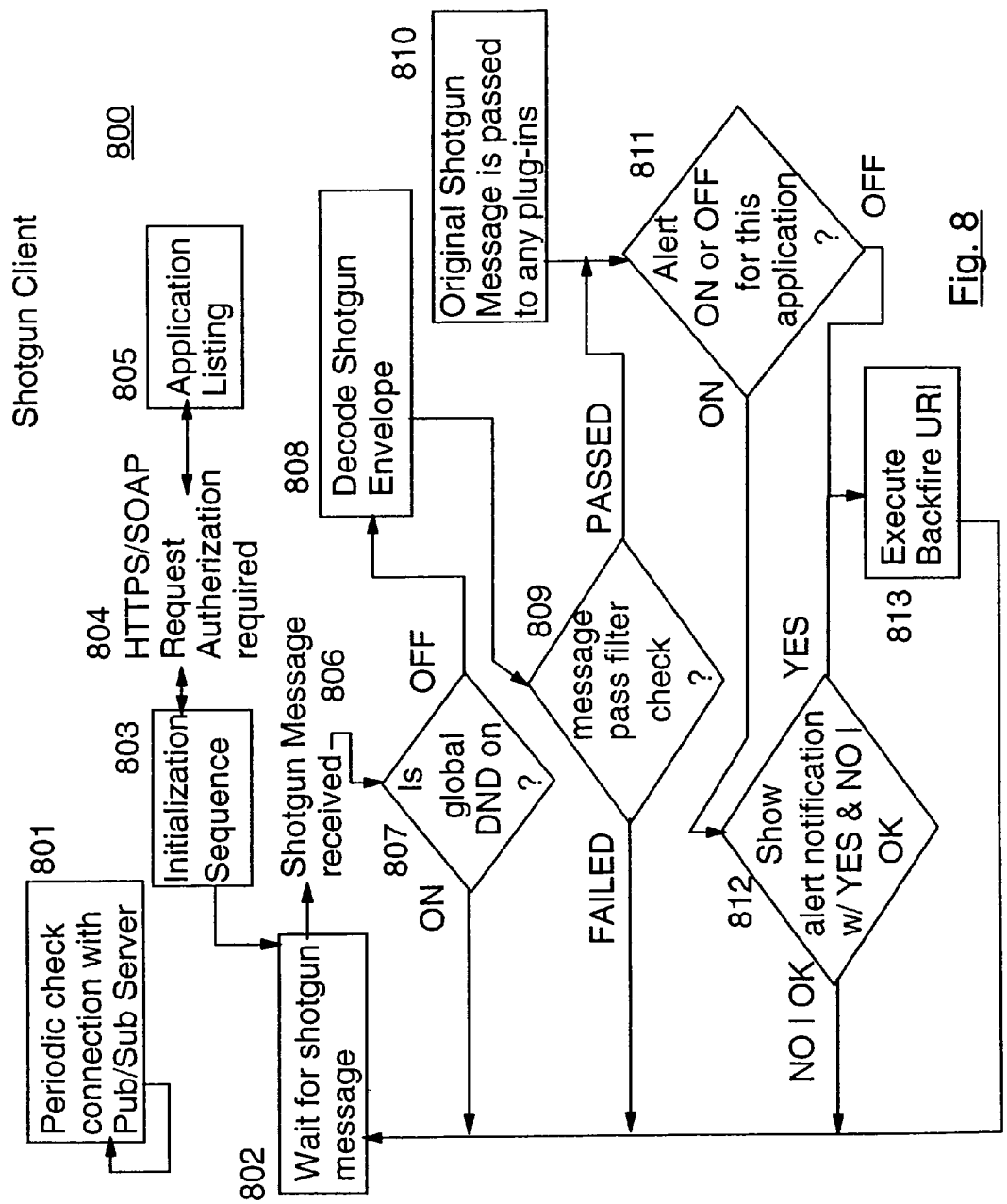
FIG. 8 is a flowchart function of a shotgun client of the present invention.
Figure 9:
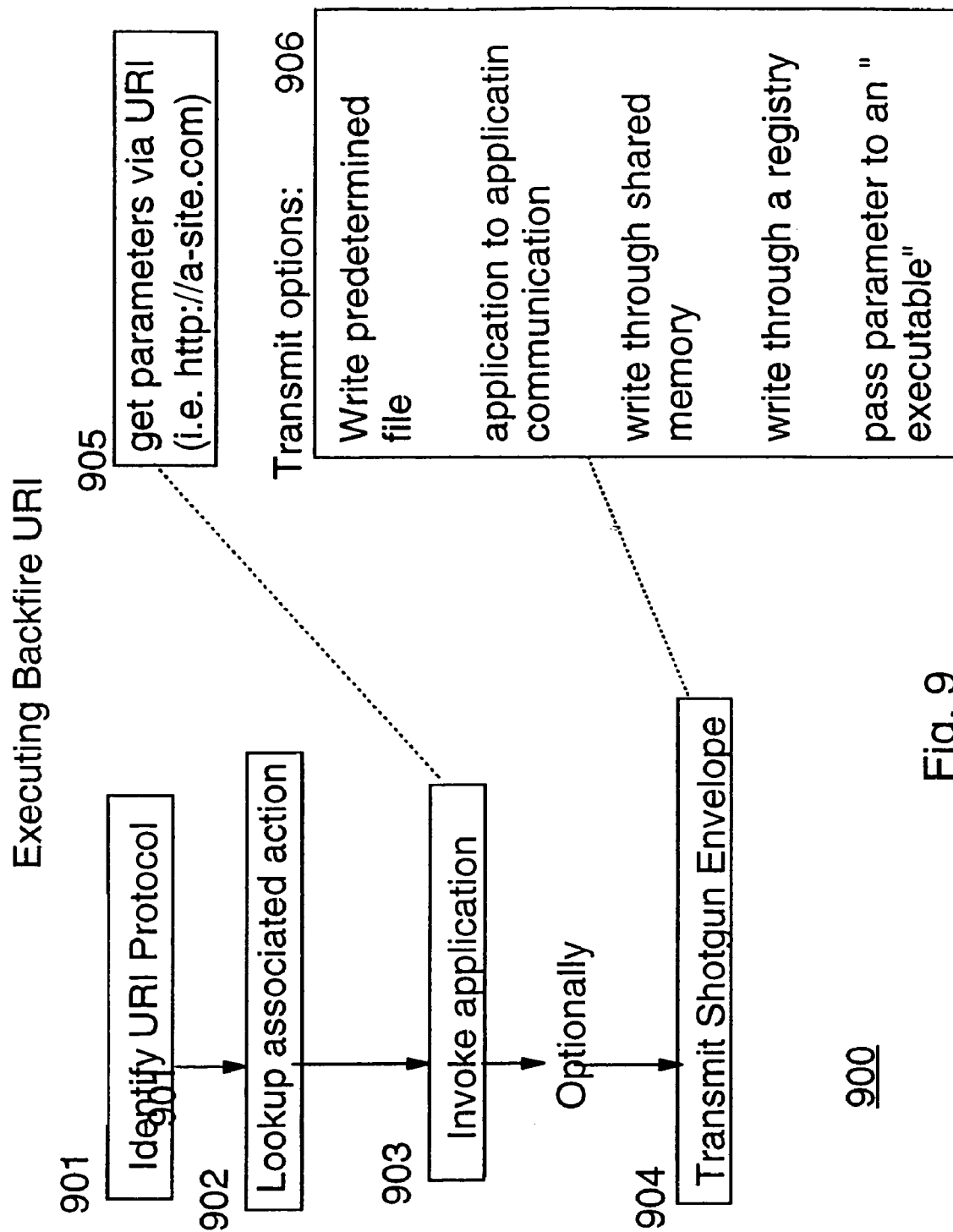
FIG. 9 is a flowchart of a shotgun client application of the present invention.

Referring now to FIG. 7, Shotgun 700 is an end-to-end Publish/Subscribe e-Utility. It includes three major components: the IBM GRYPHON "pub/sub" broker 711, a Web Service publisher 710, and a generic IBM SASH subscriber application (Shotgun client subscriber application). Working together, these services provide a complete, easy to use solution for applications requiring message broadcast capability.

The GRYPHON message brokering system merges Pub/Sub communications and database functionality using "information flow graph" concepts. The information flow graph specifies the selective delivery of events, the transformation of events and the generation of new events from providers to information consumers. In the prior art pub/sub paradigm, events in a distributed environment are classified through a set of subjects (also known as topics, channels or groups). GRYPHON extends this paradigm to allow the selection of events by content (and/or subject) rather than simply subject and to allow event transformations. GRYPHON provides a general structure for message transformation. Events may change format, drop fields or gain new fields.

The SASH application, also available from International Business Machines, is a dynamically configurable programming environment for rapidly building and deploying platform-integrated desktop applications using JavaScript and DHTML. This programming environment enables Web programming beyond the browser, and the resulting applications are integrated seamlessly into the common desktop environment and take advantage of the latest standards in Web services.

The pub/sub model allows applications to publish data on "channels", similar to television or radio broadcasting, and clients can "tune in" to listen for data—even listen on many channels at one time.

Shotgun supports multiple applications 704-706, all publishing using the same infrastructure, with each application broadcasting data on one or more channels. For example Application A might be analogous to a TV cable company broadcasting to your home several channels of programs, and you might even be watching a ball game and keeping an eye on the weather channel at the same time (e.g. using PIP). Application B might be similar to a radio station broadcasting on both AM and FM channels to your home. And Application C might be analogous to an emergency support vehicle driving through your neighborhood, announcing evacuation procedures using a load speaker—in this case, a "single-channel" broadcast of information, which you may choose to "subscribe" to by opening your window.

The Shotgun GRYPHON Web Service 710 provides two major advantages to application developers. First, it provides a convenient SOAP interface to publish messages via the GRYPHON pub/sub server 711, without the need for incorporating its lower-level API, while supporting the most common broadcast requirements. Secondly, it automates the security mechanism for controlling who can publish data on channels. This is accomplished by integrating Password authorization.

Shotgun maintains a DB2 database directory of applications, accessed through an administrative SOAP service (which can be used for controlled self-registration of user-written applications). The directory contains channel access controls, owner identification, help text, and other application parameters used by the Shotgun client.

The Shotgun client 701-703 is a Sash web application (weblication), that is downloaded from the Web. The Shotgun client serves as a common interface to the GRYPHON server 711 for all pub/sub-enabled weblications running on the client machine. A user can download his choice of shotgun-enabled weblications from the Web, and, using a settings control option from the Shotgun client GUI, can easily select applications and channels, define message filters, and control new message alerts.

Figure 10:
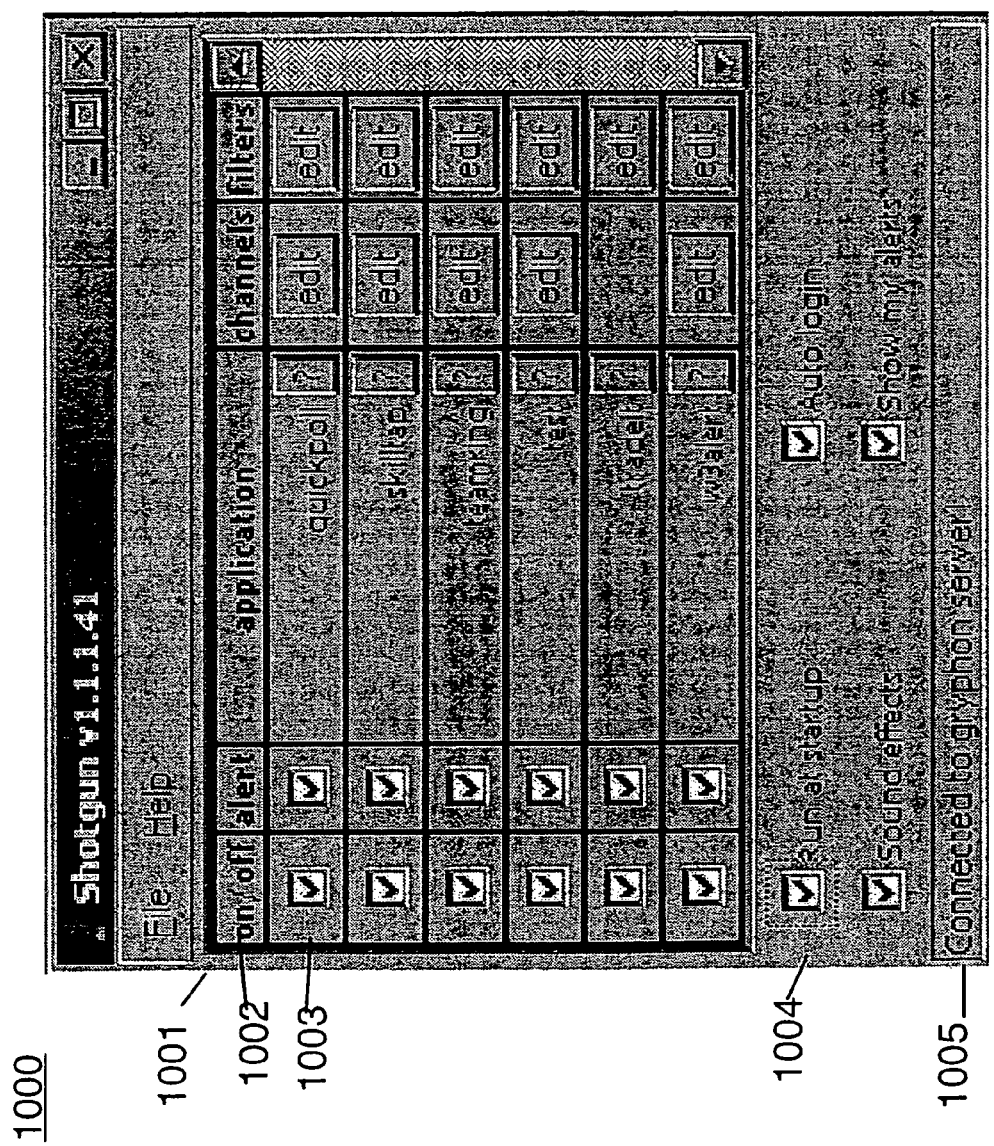
FIG. 10 is an example display of a service selection GUI of the present invention.
Figure 11:
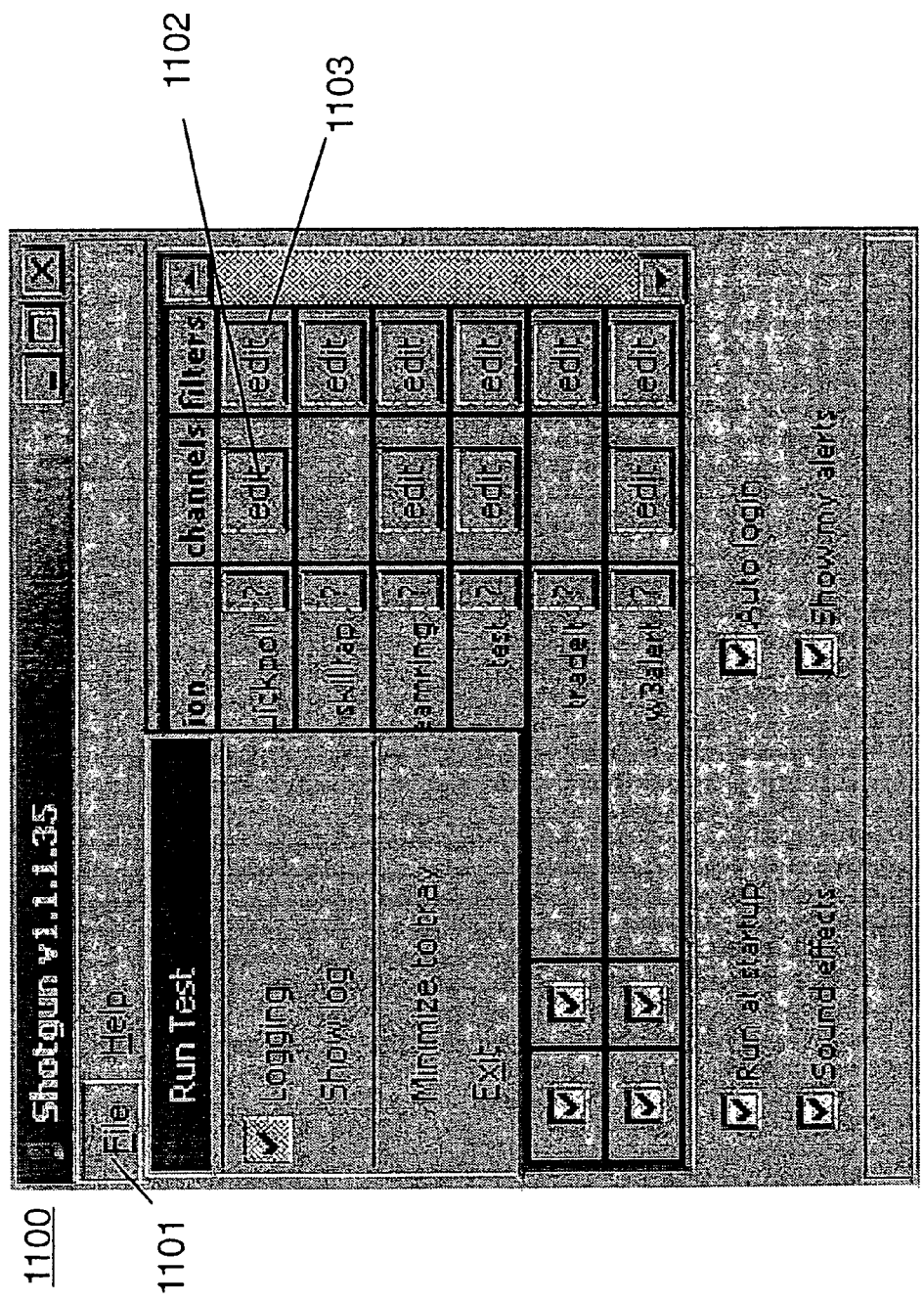
FIG. 11 depicts a second example display of a service selection GUI of the present invention.

FIG. 10 depicts a preferred embodiment of the Shotgun client GUI menu display. The display includes a list 1001 of all of the applications 1003 (Java web applications and Sash weblications) that are currently enabled for Shotgun message delivery (i.e., registered in the application directory). The column titles 1002 indicate the function below for each column of the table 1001. "On/off" indicates whether or not the user is subscribed to the application, "alert" indicates whether the user wants to receive alert messages from the application, "application" is a name of an application, "?" is a user interface (UI) button for requesting information about the application such as a brief description of its function, "Channels" is a UI button for selecting channels within the application and "filters" is a UI button for selecting filtering criteria for the application. As can be seen in the example 1003, the application "quickpoll" is subscribed to (on/off is checked) and alerts are requested (alert is checked). Other functionality 1004 is common to all selected applications. In the example 1004, the applications selected start to run at startup time, sound effects are enabled for the selected applications, login automatically is enabled allowing the shotgun system to login to the applications automatically and alert messages are allowed to automatically display. An indication of the network status 1005 shows that the shotgun client is connected to the GRYPHON server.

"QuickPoll" and "SkillTap" are implemented as Sash weblications and must be downloaded separately from the Web (Sash Weblication Factory). "TradIt" is a Java Websphere application, which requires no shotgun client download. "Test" is available for users to send test messages to simulate application publishing, and to test alert handling for channel and text filters. As mentioned earlier, some applications support multiple channels and others require no channel selection. In the example 1100, QuickPoll allows user selection of listening channels.

Figure 12:
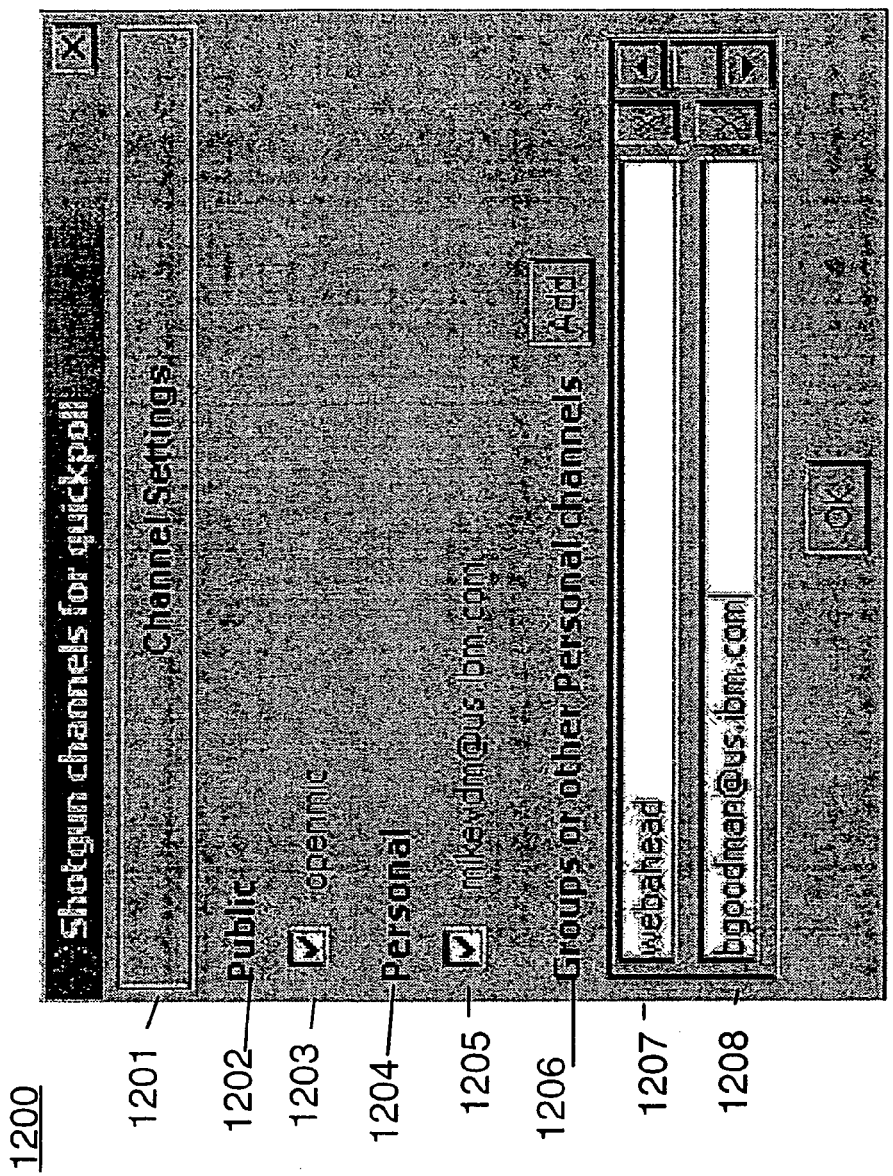
FIG. 12 is an example display of a channel selection menu.

In FIG. 12, pressing the "edit" button 1102 for the "quickpoll" application in the "Channels" column brings up a window 1200 at the shotgun client terminal. If the application provides a public broadcast channel (meaning anyone can subscribe), its name is displayed first ("openmic" 1203 in this case). Anyone with a valid ID is allowed to publish on this channel. To listen for messages on the public channel 1203, the user selects the check box 1203. Next, if enabled by the application, is the personal channel 1205, which matches the user's personal network ID. Only the user can publish on this channel, but others can elect to listen. A check in the Personal box 1205 enables the user to receive any data he publishes.

In the preferred embodiment, a user has the option to add as many other personal channels 1208 (i.e., your manager's Intranet ID) or "group" channels 1207. Groups 1207 are defined using a program called BlueGroups. The Shotgun GRYPHON Web Service will authenticate the publisher's network ID to ensure that it is a member of the group and that the channel name on which the data is published matches the group name. In the example 1200, only members of group "webahead" (defined as a set of department numbers via an LDAP search filter) are allowed to publish on the webahead channel 1207.

Figure 13:
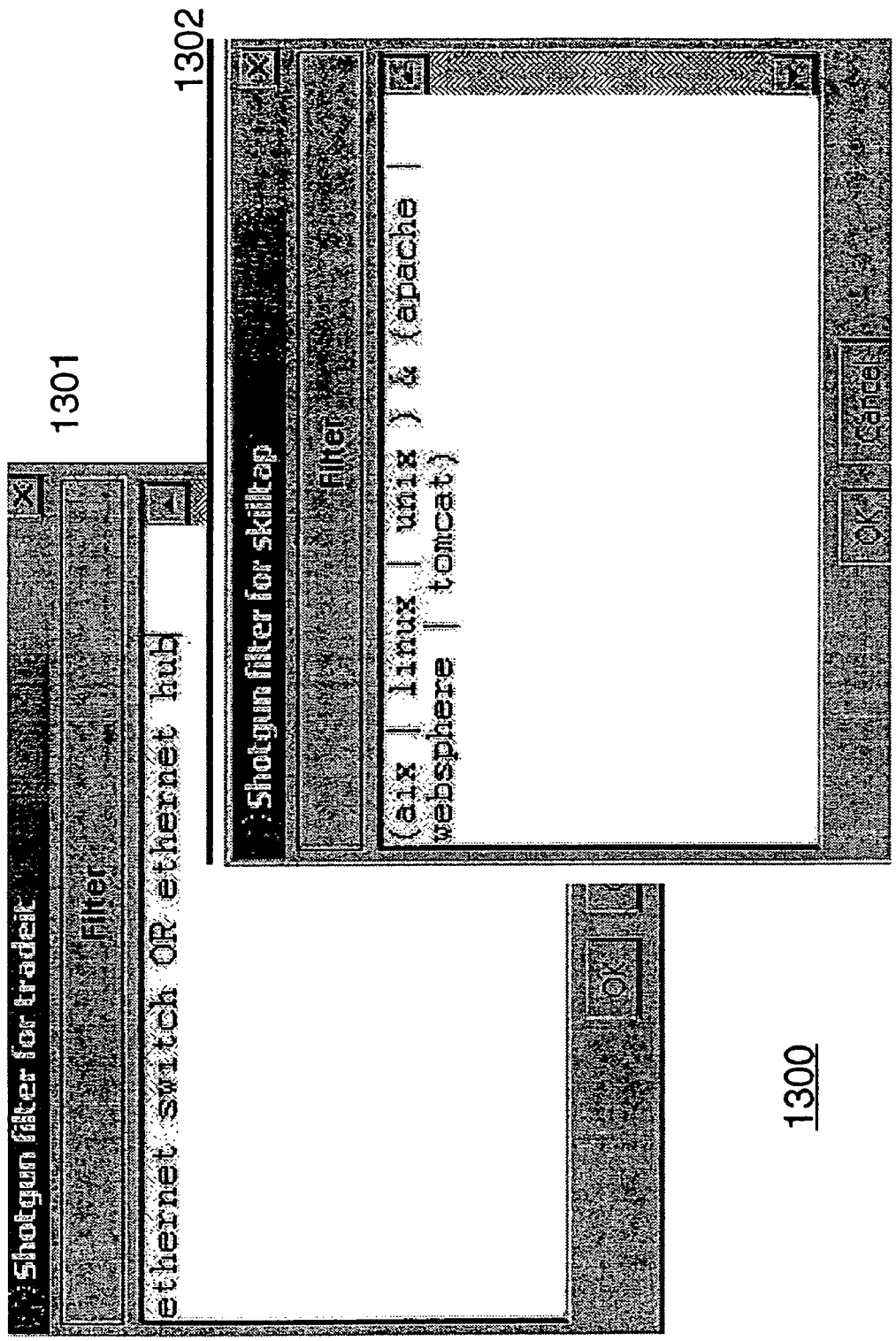
FIG. 13 is an example display of creating filters for selected applications.

Referring now to FIG. 13, in addition to channel selection, a user may set message "filters" for any application using the "edit" button 1103 on the settings menu 1001. The message filter allows the user to test for certain words, phrases, or combinations using simple "AND" and "OR" expressions or even complex programming-style expressions that evaluate to true or false, to determine whether he will be presented with an alert box displaying the incoming message. This allows the user to filter out unwanted messages.

Figure 14:
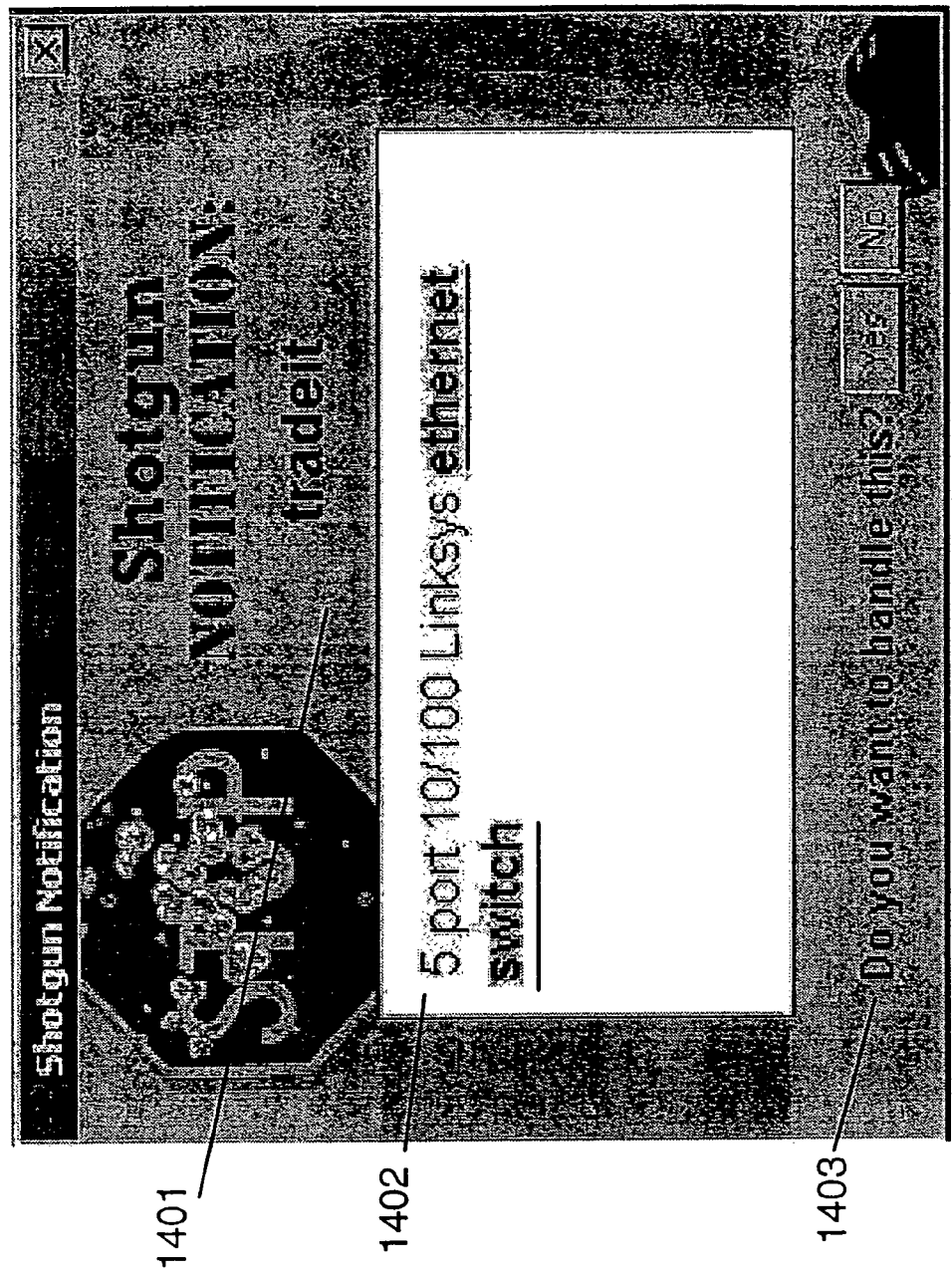
FIG. 14 is an example of an alert message of the present invention.

FIG. 14 shows two sample filters. The tradeIt application filter 1301 alerts the user when a coworker posts an item for trade that the user needs. Here the user has elected to receive messages that contain the key phrases "ethernet switch" or "ethernet hub". The second example is the SkillTap application filter 1302, which allows the user to immediately see requests for assistance as posted by fellow employees. Here, only messages that contain any of ("AIX" or "LINUX" or "UNIX") and also contain any of ("APACHE" or "WEBSPHERE" or "TOMCAT") will display an "alert" message on the user screen indicating an incoming message.

When an "alert" option in the settings menu is checked for an application, messages that contain the information defined by the channel and filter settings will cause a notification window to display rather than displaying the filtered message immediately. FIG. 14 shows an example alert message 1400 for the "tradeit" application (identified in the alert window 1401) that includes the filter criteria "ethernet switch" in the alert message 1402. The alert display includes an action UI button function 1403 that allows the user to decide whether or not he wants to continue in the application, in which case he hits the "yes" button.

The application ("Tradeit" in this case) is shown in the alert window 1400 of FIG. 14, along with a "blast" message 1402, with words highlighted in red that match the filter rule that was fired. The user then has the option 1402 to ignore the event, or select "yes" to trigger a "backfire URL" that was set by the application. In this example, Selecting "yes" will cause an Internet browser window to launch for an HTTP URL (in the case of a web application, such as Tradeit). In another embodiment, another Sash weblication may be launched by the backfire URL (such as QuickPoll or SkillTap). In this case, the Tradeit backfire URL calls a servlet that displays details about the item posted for trade by the responder. Note 1000 that if the "alert" option is unchecked in the selection table, but the application is enabled (via "on/off"), and an incoming message passes the channel and filter rules, the backfire URL will be launched immediately.

Table 1 shows example message fields for a preferred embodiment. Table 2 shows an example "request for publish" message and a corresponding "publish" message.

TABLE 1

Message Fields:

Blast
    Possible values: string
    Used as the message present to a user if alert mechanism is active
Payload
    Possible values: string
    Non-Shotgun application specific information
Backfire
    Possible values: null, string in the format of proto://params and args
    URI defining action needed to be taken to fulfill
Channel (Added by publish mechanism)
    Possible values: null, string
    Channel the message is intended for
Publisher (Added by publish mechanism)
    Possible values: string
    ID of the publisher
Proxy (Added by publish mechanism)
    Possible values: string
    ID of the user the publisher is publishing on behalf of

TABLE 2

"Request for publish" message:
    <shotgun>
    <blast><![CDATA[This is a blast message.]]></blast>
    <payload><![CDATA[This is a payload message.]]></payload>
    <backfire><![CDATA[sash://{81fb0181-3c37-40b0-8e6d-df1602bdd820},
    {C60A405E-A3C1-4B14-B3A4-C2366ADCF0FC}]]></backfire>
    </shotgun>
Published message:
    <shotgun>
    <channel>w3alert</channel>
    <publisher>w3alert@us.ibm.com</publisher>
    <proxy>bgoodman@us.ibm.com</proxy>
    <blast><![CDATA[This is a blast message.]]></blast>

TABLE 2-continued

<payload><![CDATA[This is a payload message.]]></payload>
    <backfire>sash://{81fb0181-3c37-40b0-8e6d-df1602bdd820},
    {C60A405E-A3C1-4B14-B3A4-C2366ADCF0FC}</backfire>
    </shotgun>

Figure 15:
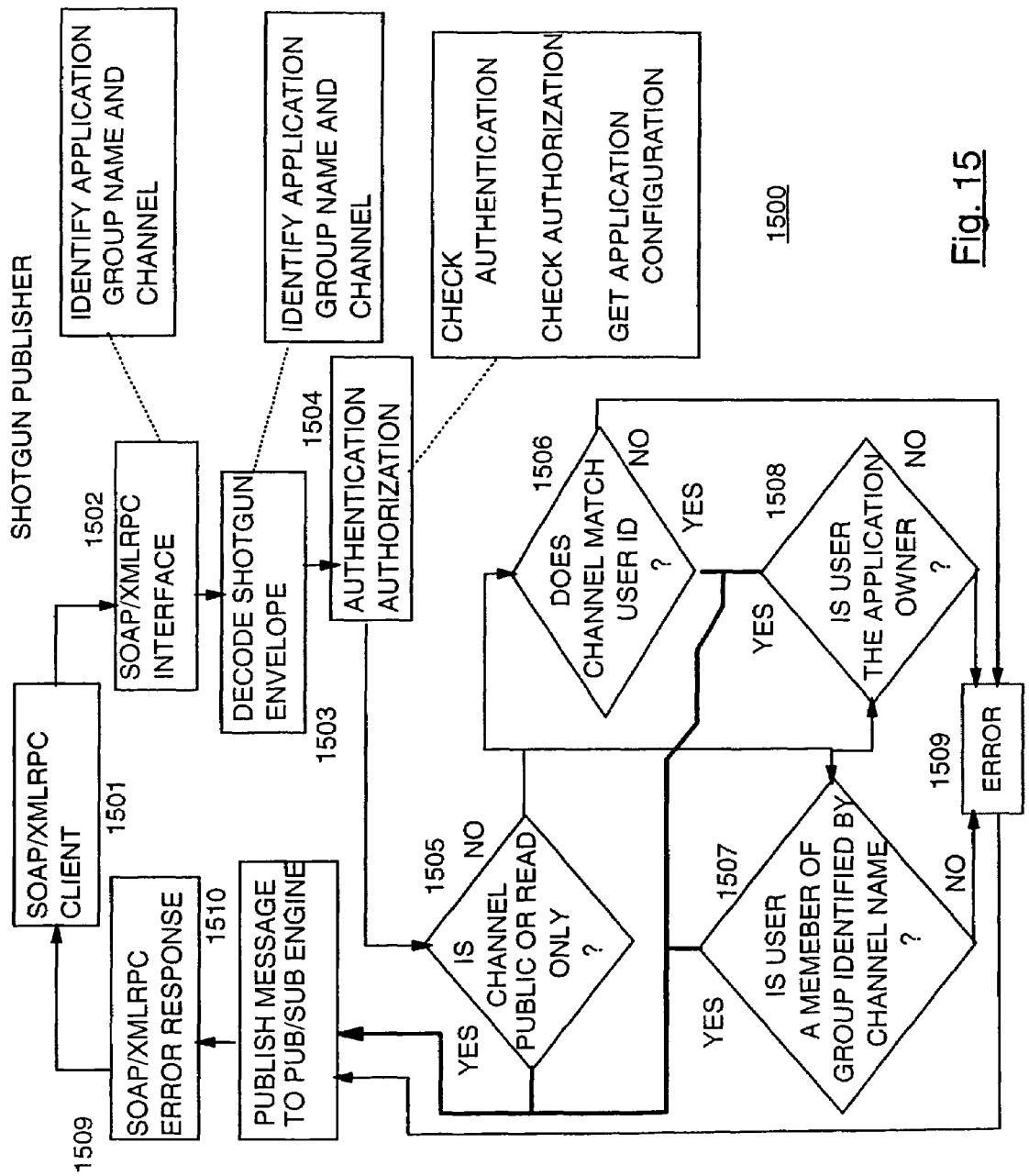
FIG. 15 is a flowchart example of the publisher function of the present invention.

FIG. 15 represents an example flow depicting shotgun authentication of a content publisher for publishing messages through a pub/sub engine. The content publisher application requesting the publication presents identifying information (group name, channel ID, etc.) via the client/Shotgun interface 1502 in a SOAP envelope. Shotgun decodes the envelope 1503 to extract identifying information and passes it to an authentication/authorization module 1504. The module 1504 is responsible for checking authorization and authentication and retrieving the predefined application parameters (configuration) associated with the content publisher. Shotgun checks whether the channel is public or read only 1505, in which case no user authorization is needed. If user authorization is needed, the channel must match the user ID 1506, the user must be a member of the group identified by the channel name 1507 (via a lookup table for example) or the user must be the application owner 1508. If these conditions are not met, an error message 1509 is returned 1511 to the client 1501.

Figure 16:
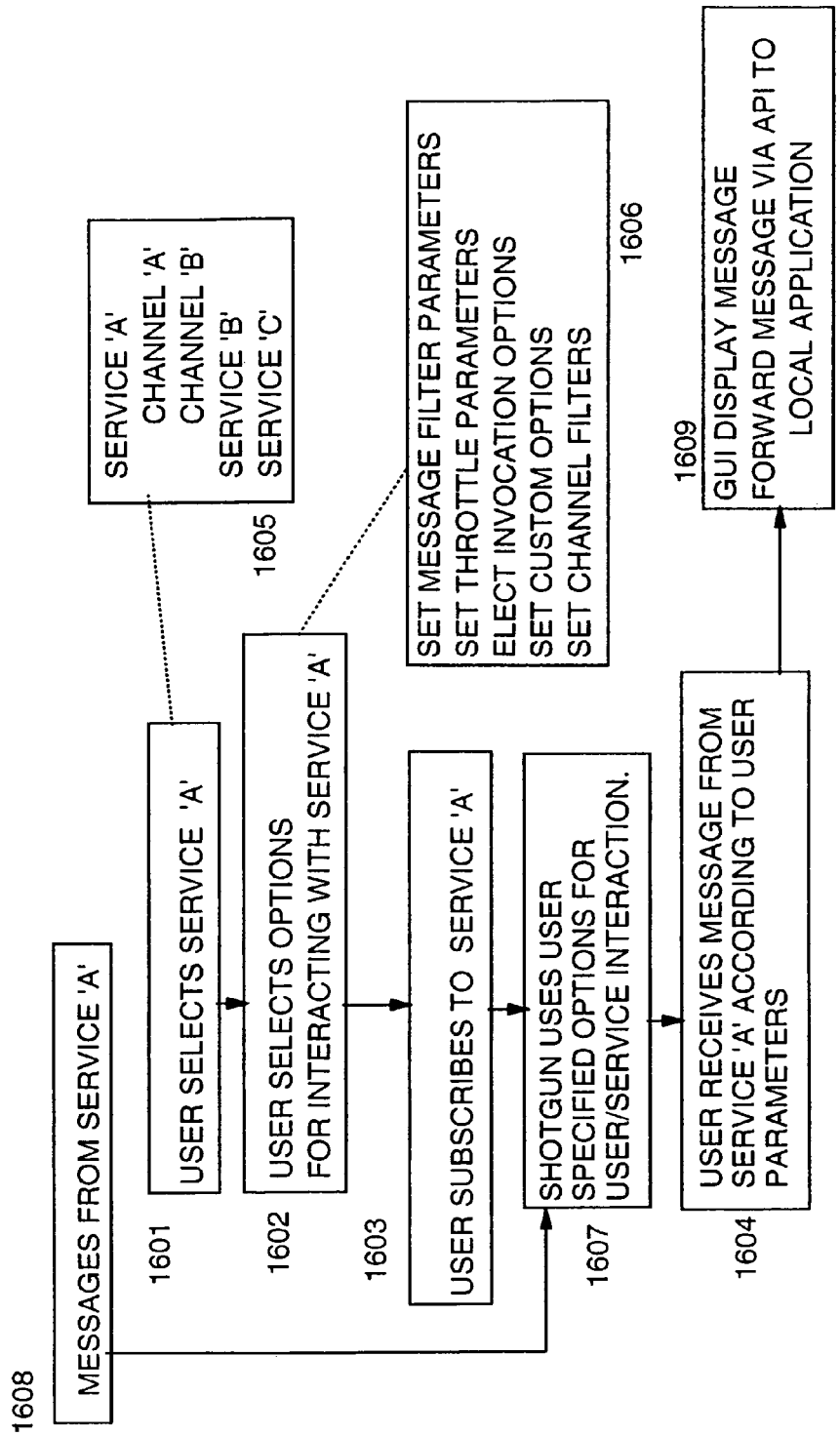
FIG. 16 is a flowchart example of coded messages.
Figure 17:
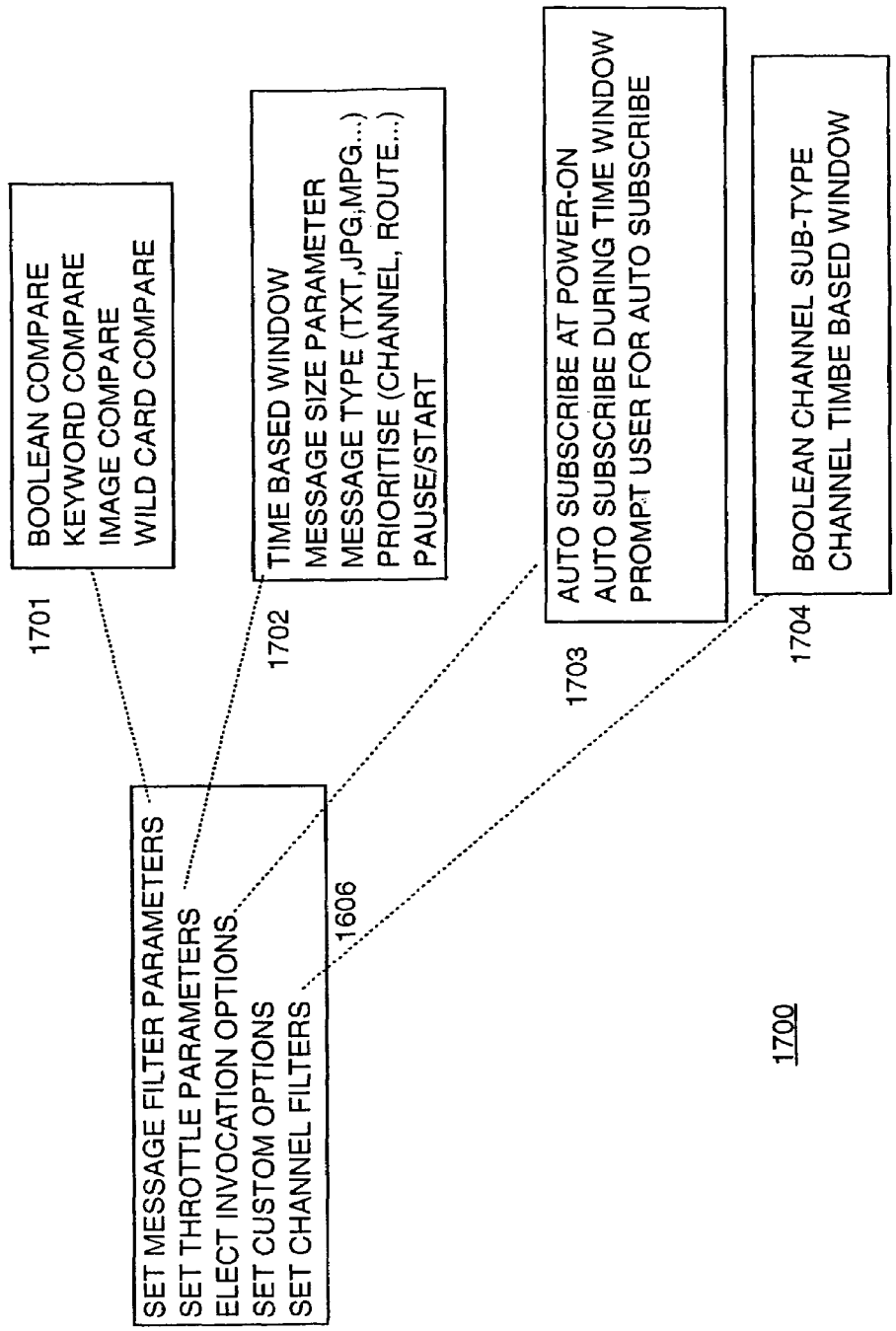
FIG. 17 is a flowchart example of setup options.
Figure 19:
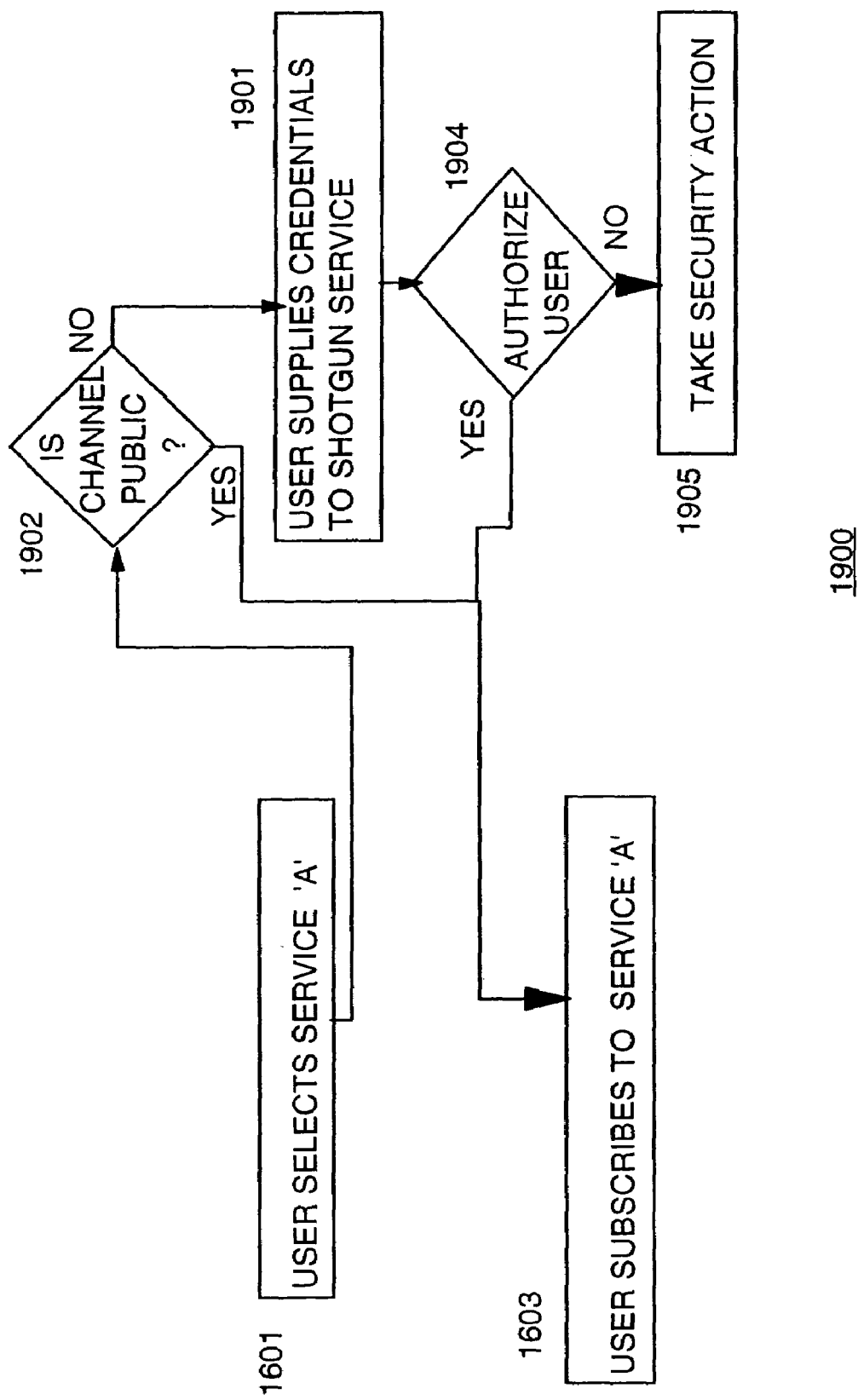
FIG. 19 is a flowchart example of subscribing to a service.

FIG. 16 shows an example flow for Shotgun message content filtering. The user, wishing to subscribe to service 'A', selects Service 'A' 1601 from available services 1605 preferably using a GUI window provided by Shotgun. The GUI selection, in one embodiment permits selecting various combinations of services and/or their channels. Channels are subtopics within a service. FIG. 19 shows an embodiment flow of user authorization for a Service. Shotgun checks whether the channel is public or not 1902, if it is, the user needs no authorization 1603, if it is not, the user supplies credentials for authorization 1901 to Shotgun. If the user's credentials are correct, the user is subscribed to the service 1603, otherwise a security action is taken 1905 such as prompting the user for correct credentials, providing a means for the user to obtain credentials (pay a subscription fee, agree to a license and the like), report the attempt for subscription to the service owner and the like. The GUI window supports the user selection of various options 1602 for interacting with the selected service or channel. Options 1606 in FIG. 17 include setting up message filter parameters 1701 whereby the content of incoming messages from the service or channel are screened for such things as keywords, key phrases, boolean combinations of text, media type, wild cards, comparing images and the like. Throttling parameters 1702 are selected, these include limiting the number or frequency or size or media type of incoming messages from the channel or service (txt, gif, jpg, mpg . . . ), prioritizing incoming messages by content or relative to other channel messages, providing a time based (time window) for presenting channel messages, providing user GUI control of incoming messages (pause/start) and the like. The user can elect invocation options 1703 such as automatic subscription when the user takes an action (such as powering up his computer, time based subscription, reminder message to the user of his current subscription status and the like). Where a service provides channels, they are subscribed to as a group in one embodiment and channel filters 1704 are available to the user to coordinate messages from available channels of a service. Other "custom" options are available such that a programmer can extend the capabilities of Shotgun via an API.

The user subscribes to Service 'A' 1603 preferably by a single action of selecting a 'subscribe' button on his Shotgun setup GUI. Once the user has successfully subscribed to the service, the pub/sub engine includes the user in it's broadcast of messages from the service 1608. The Shotgun client uses the predefined functions to support interaction of messages 1607 with the user's GUI 1604.

Figure 18:
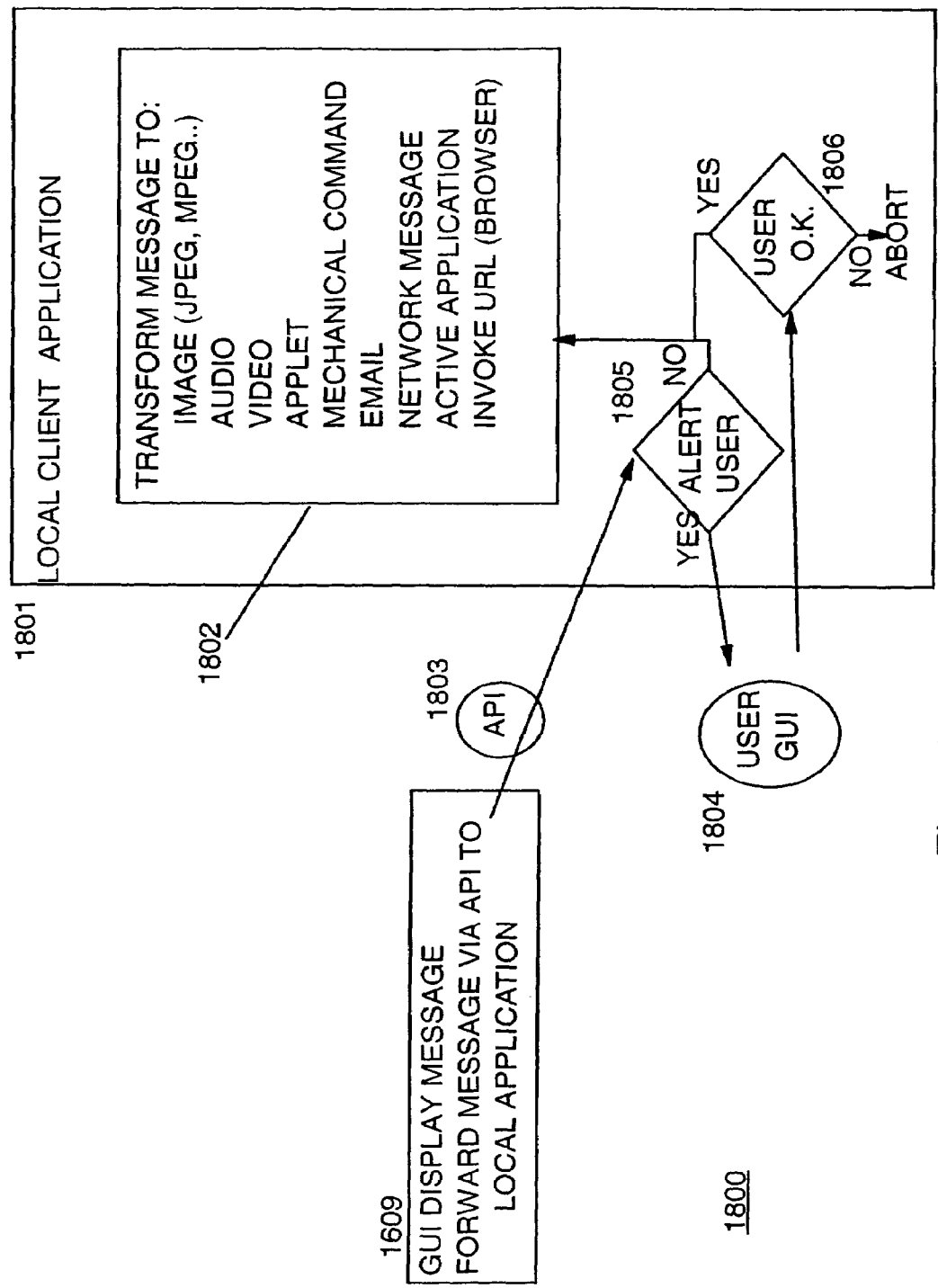
FIG. 18 is a flowchart example of message usage.

In a preferred embodiment FIG. 18, messages 1609 are displayed at the user's terminal or forwarded to a custom application 1801 via an API 1803. The custom application can be one that is supplied in messages from the channel (plug-in), or separately supplied electronically or by other media familiar to one skilled in the art. These applications support 1802 transforming messages to control mechanical machinery, display video or play audio (mpeg), transform from Text to Voice or Voice to text, send electronic mail, invoke a URL using the client's browser or any other transformation familiar to one skilled in the art. In one embodiment, the local application 1801 optionally 1805 sends an alert signal to the user 1804 announcing invocation of the client application 1801 or message, the user elects 1806 to perform the function of the application 1801 by taking an action or to abort it.

Figure 20:
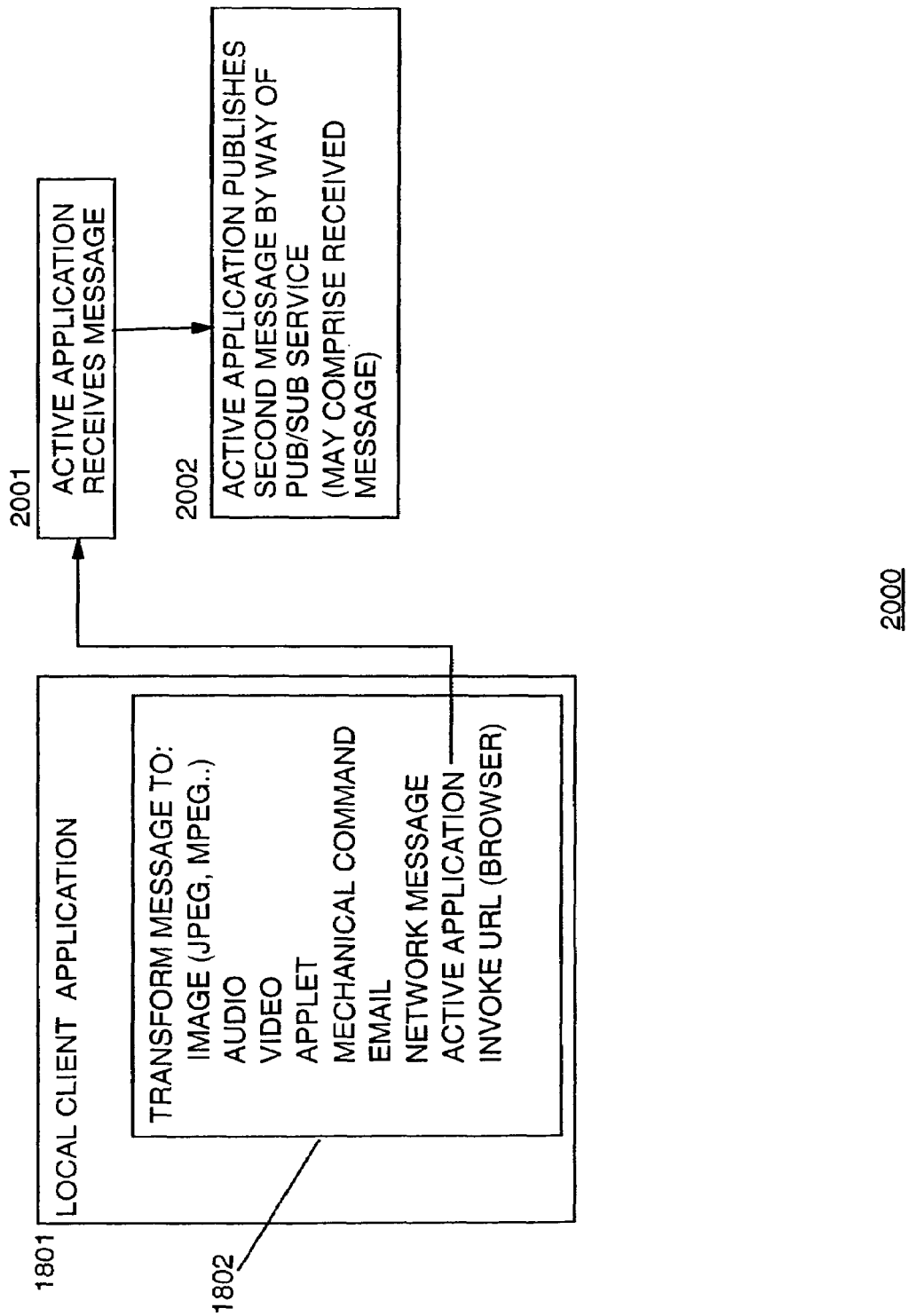
FIG. 20 is a flowchart example of client message processing.

In one embodiment FIG. 20, the local client application 1801 may invoke an 'active application' plug-in that is a content service for a pub/sub engine. The active application 1802 receives messages 2001 from a content provider by way of a pub/sub channel. The active application transmits a second message (may include the message received 2001) to a pub/sub service for publication to subscribers. Thus, the user may become a "one to many" re-publisher of published content received from a pub/sub engine.

Figure 21:
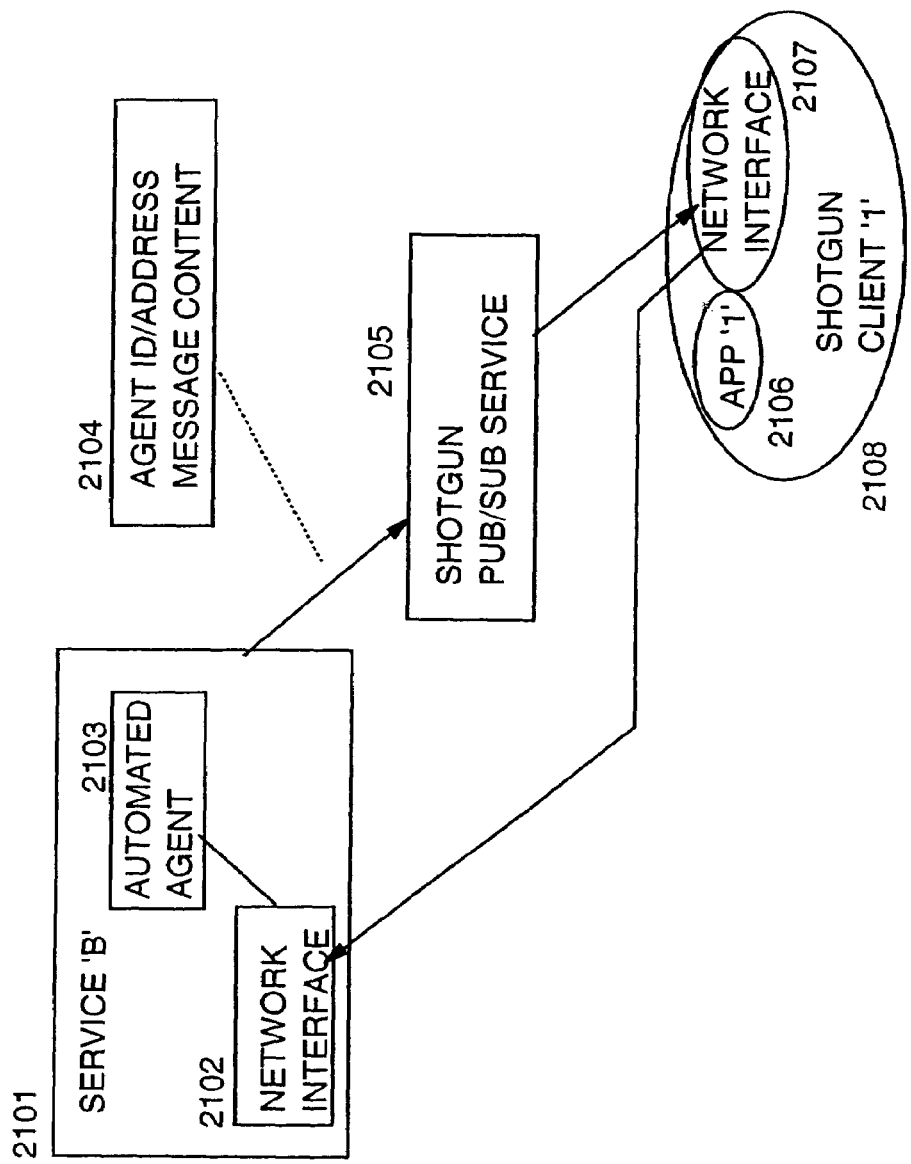
FIG. 21 is a logical depiction of interaction between a client and a service according to the invention.

FIG. 21 is a logical depiction of components of a preferred embodiment of the present invention providing two way communication using published messages and responses. A content Service 'B' 2101 includes an automated agent 2103. The automated agent 2103 is an application that is running to perform functions ordinarily performed by a user/operator. The automated agent may optionally comprise artificial intelligence that can interact with a user and using AI techniques (inference), can prompt and respond to user's input. Service 'B' 2101 further comprises a network interface such that a client application 2106 can communicate with Service 'B' 2101 by using the appropriate ID/address mechanism 2104 according to the network protocol. The Service 2101 publishes to subscribers via Shotgun 2105 messages including information identifying Service 'B's network ID and address 2104. Clients 2108 subscribing to Service 'B' include applications (App '1' 2106) for receiving messages published 2015 from Service 'B' 2101 via the network interface 2107 and communicating with the Service 'B' 2101 in response. Thus in the embodiment, a service 2010 publishes content through a shotgun pub/sub service 2013 to subscribers 2108 (who may be anonymous to the Service 'B' 2101) each of whom in turn can respond to the service via a network protocol.

Web Service Interface:

In the World Wide Web (the Web), program applications providing services are called "Web Services". These are programs (located on remote servers) that may be used by a programmer to perform part of the application he is providing. For example, a programmer may create a Web Page (awebpage.com) that displays regional weather. The programmer can create his web page using HTML and supporting images (jpg, gif for example). For regional weather, the programmer takes advantage of web services to perform the needed function, he "calls" a weather web service program in his awebpage.com HTML. The call provides parameters (such as local post office zip code) to the weather web service over the network. The web service returns the requested information to the client to be displayed by the browser as part of the awebpage.com page.

Web services are useful in reducing the amount of code a programmer must write and maintain. He only needs to provide the interface for the service in his program.

Recently, a standard XML based interface has been defined (WSDL) that allows programmers to easily interface with web services.

Figure 22:
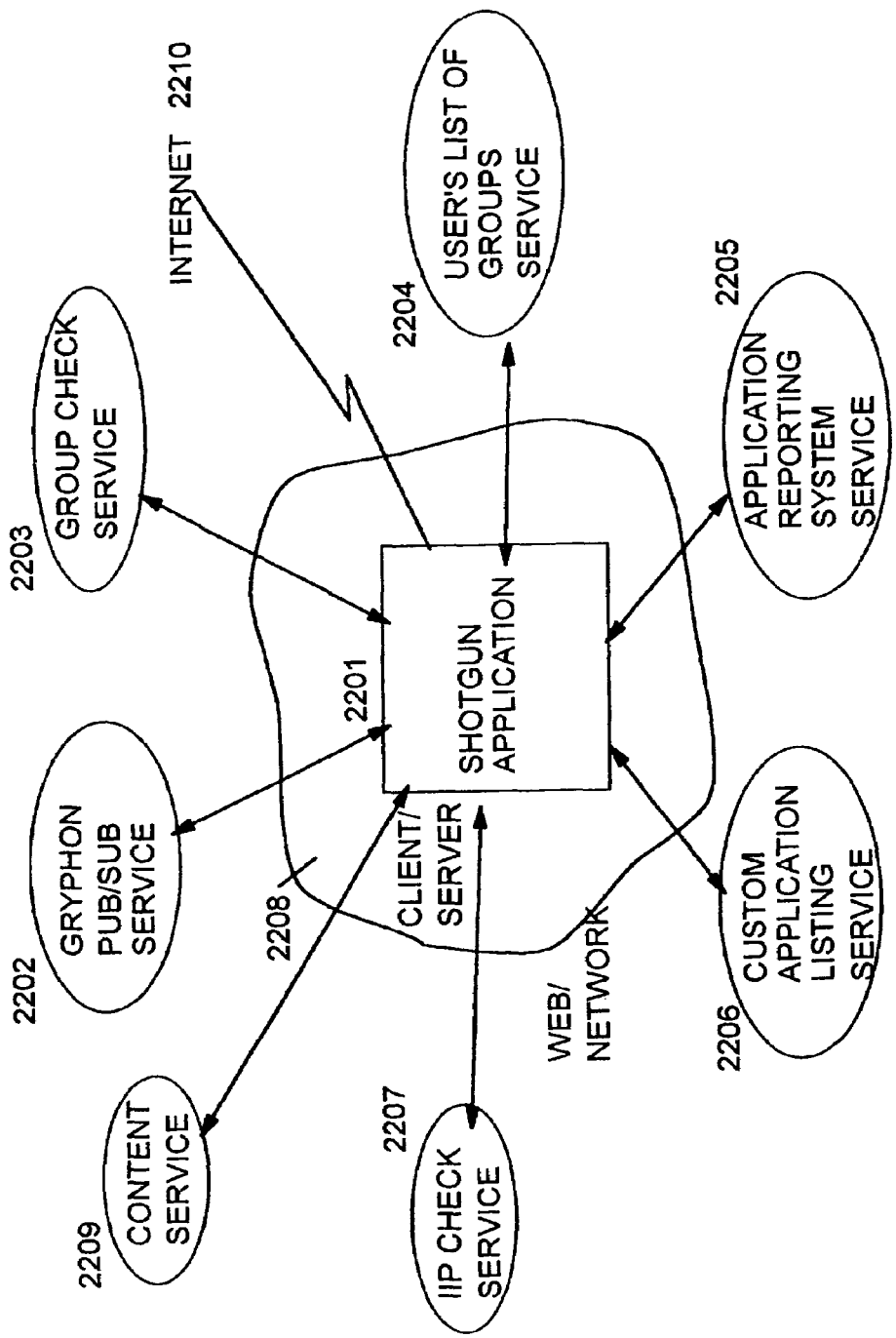
FIG. 22 depicts a Web services implementation of Shotgun.

In the present invention, refer to FIG. 22, secure pub/sub publishing utilizes a web service 2202 to perform the pub/sub service. Thus, shotgun performs various functions including authentication and "calls" the pub/sub service GRYPHON to perform the actual "one to many" publication.

Shotgun 2201 running in a client/server environment 2208, accesses needed services 2202-2207 over the web. The function is similar to a function call. When the Shotgun application 2201 has authenticated a content service 2209, Shotgun "calls" the PUB/SUB service 2202 (a web service, accessed by Shotgun over the Web) to perform the publication function for content provided by the content service 2209 that is published to the list of users (who are subscribers to the content service) by way of the Internet 2210.

Other web services used in a preferred embodiment of the present invention include:

Secure Publishing 2202:

(Secure Publishing via the Pub/Sub Server on Channels)

This service 2202 is an enabling service. It provides a common interface to publish Shotgun messages over pub/sub infrastructure. Since it is provided by a web service, if the Shotgun protocol changes the web service need not change. Changes would occur at the web service level. Code that calls the web service would stay the same. If GRYPHON were abandoned and a different utility to provide pub/sub were needed, a programmer would substitute the new pub/sub service in place and publishing could continue to occur as is without modification to client code.

IIP Check 2207:

(Verifies User Name and Password Against a Corporate LDAP Directory)

When the user logs into Shotgun he is using his Corporate ID and Password. Verification (authorization) is performed by a Security web service 2207 on behalf of the user. This allows the programmer to change the back end LDAP server to a DB2 database for example, without disrupting the user. The web service interface stays the same.

GroupCheck 2203:

(Verifies Group Membership Against Corporate Directory)

GroupCheck service 2203 ensures that users subscribing to pub/sub channels are authorized members of that channel. Instead of distributing this code with every client, the GroupCheck code is provided via the common interface as a web service. This service interfaces with the corporate LDAP servers to verify group membership. If the back end system needed to change it could without modification to the client code.

Custom application listing 2206:

(Upon Startup an Authenticated Web Service Provides a Custom application listing based on user ID/Group Membership)

A custom application listing service 2206 is accessed via the web service interface. The actual data is stored in a DB2 database. Based on the users ID and membership a customized subset of the available applications is marked up in XML and returned as the result to the call to the web service. If the programmer wanted to, he could decide to store the data in LDAP rather than the DB2 database and would effectively be switching web services. The listing change would not require any change to client code.

"Groups You are a Part of" Listing 2204:

(Ability to Provide a List of all Groups You are a Member of to Aid in Pub/Sub Channel Subscription)

As group membership grows users will need to continue to know what channels/groups they are a part of. This web service 2204 constructs a query that returns a list of all the groups of which a user is a member. The user might be added to a group and not be told of it. With this service the group would be revealed to the user and the provided a UI could be integrated into any application needing Group browsing.

Application Reporting System (ARS) 2205:

(Provides a Generic Way to Generate Transaction Logging With/Without Bill-Able Unit Type Information)

The ARS 2205 is used behind the scenes to provide "logging". For example, it logs when a user signed on, what channels he signed up for and when he signed off. This provides clients the ability to log to a central database without needing the dependent DB2 libraries or DB2 code. Instead, they interface with the web service which means that if DB2 is no longer the DB of choice mySQL could be dropped in and every client stays the same. Any changes would be done at the web service.

In a preferred embodiment, a "Plugin" module is supported by the Shotgun invention. The module comprises programs that perform additional function. The module is selectively attached to the Shotgun client by way of an application program interface (API) and receives messages directed to the user.

Figure 23:
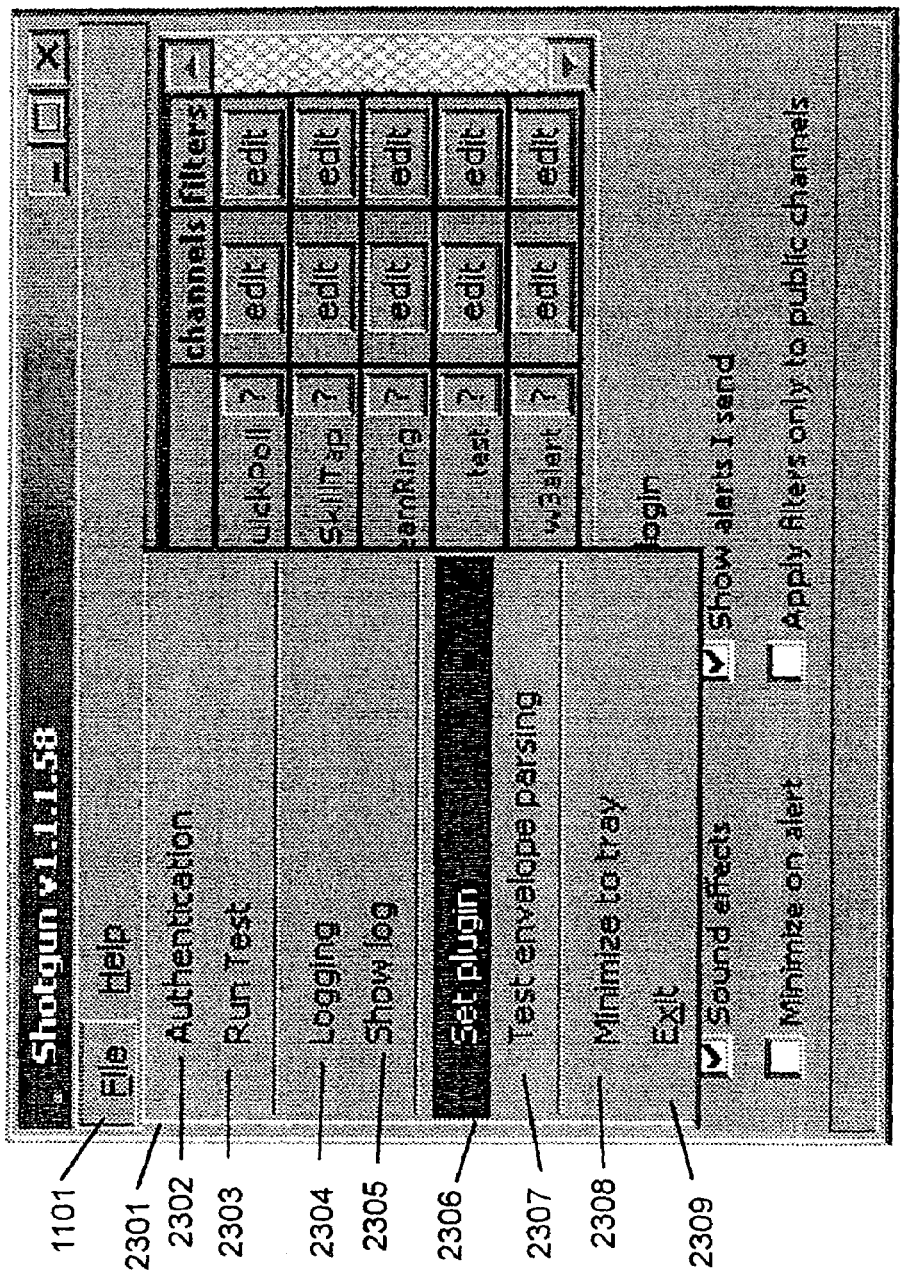
FIG. 23 is an example GUI used to elect options.
Figure 24:
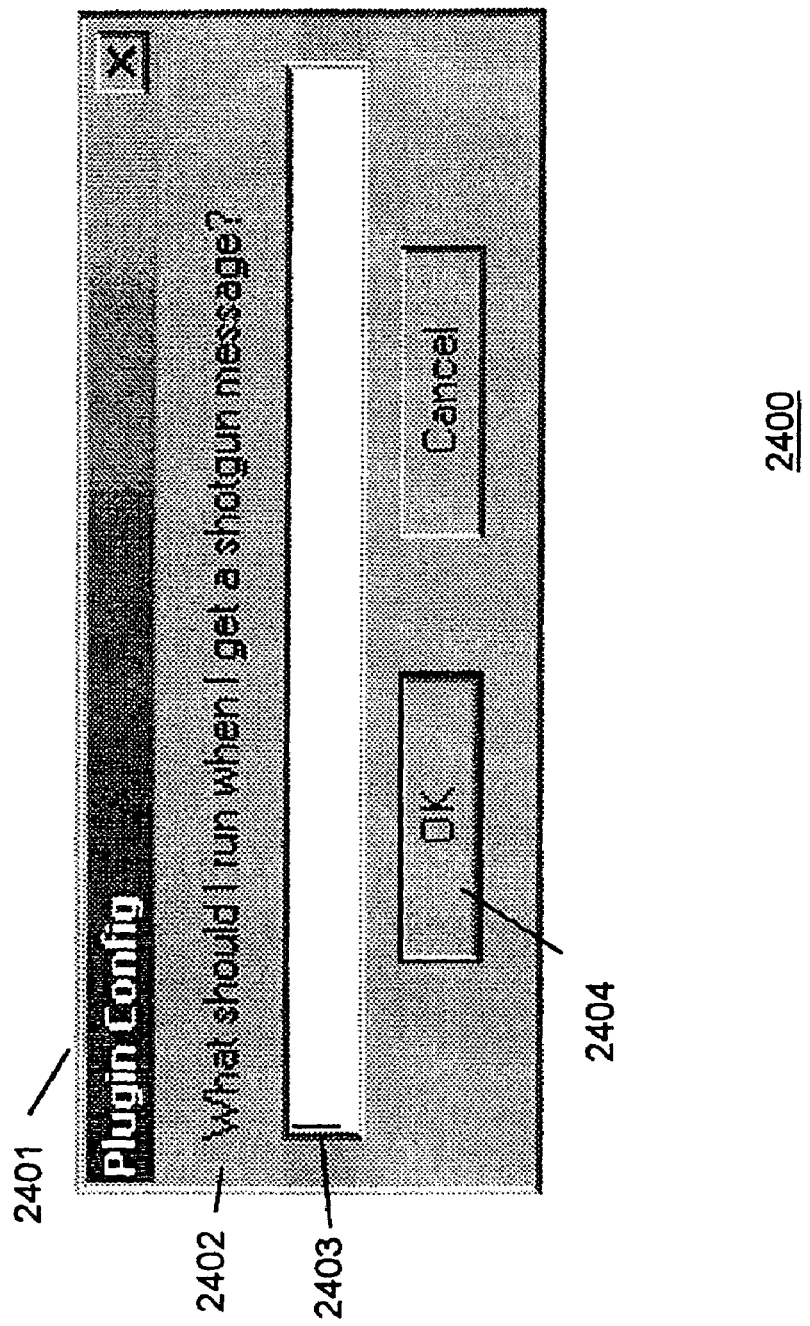
FIG. 24 is an example GUI used to set a "Plugin".

An example use of the Plugin method of the present invention is displayed in FIG. 23. The user GUI that allows him to elect the channel and filter options he is interested in also permits him to "Set Plugin" 2306. When he elects this option, a screen FIG. 24 2401 is displayed. The user is prompted for Plugin information 2402 and he enters into the text window 2403 the function (program) he wants to perform on the incoming messages.

In one embodiment, the plugins are predefined functions that can be selected via a GUI prompt. In the present example, the user is allowed to identify the file location of the code he wants to enable ("Forward") and the parameters he wants the program to use. In the present example, the Forward Plugin module that the user enters into the GUI prompt 2401 is shown in Table 3:

TABLE 3

C:\SGplugin\Forward\apl2win -hostwin off -sm piped -input
"')load ''C:\SGplugin\Forward\MSG.apl''' 'To'
'EMAIL:9995551212@messaging.sprintpcs.com'
'TOPIC:shotgun/w3alert/*'
'LOG:on,C:\SGplugin\Forward\SGmsglog.txt' '&xml' ')off'"

To forward Shotgun alerts to a mailbox, a SKYTEL pager, or to a cell phone using SMS messaging, a user would copy this code as his Shotgun "plugin" (select "Set plugin" 2306 under the "File" 1101 menu option), replacing the "EMAIL:" tag in the code with his own messaging ID.

The example above will forward all Shotgun "w3alert" application messages ('TOPIC:shotgun/w3alert/*') as SMS alerts to SprintPCS phone number 9995551212. If a user only wants to forward w3alert messages sent to a particular Blue-Group channel, he would replace the "*" (wildcard) with the group name. The "LOG:on,pathname" option turns logging on, so that messages forwarded via the plugin will be logged to the specified file with the return status from the mail-forwarding web service. If the user modifies the default directory during installation, he would need to adjust the pathnames in the appropriate command line above. Table 4 shows example APL code supiorting the preferred Forwarding embodiment.

```
)LOAD MOBALERT
SAVED 2002-07-16 13.26.26 (GMT-4)
        ∇To [□]∇
[0]     To;CH;F;FROM;L;LF;MSG;P;SUBJ;SV1;TF;TO;TOP;XML
[1]     A FORWARD A SHOTGUN ALERT TO A MOBILE DEVICE
[2]     TO←6↓□
[3]     TOP←UPC 6↓□
[4]     LF←'ON,'=UPC 3↑F←4↓L←□
[5]     F←3↓F
[6]     LAST_XML←XML←∈∆FV TF←□
[7]     DELETE TF
[8]     →(0=ρCH←'topic' XGET XML)/END
[9]     A IS THIS A CHANNEL WE ARE INTERESTED IN?
[10]    →(~(UPC CH)MATCH TOP)/END
[11]    A WHO IS THE SENDER?
[12]    FROM←'publisher' XGET XML
[13]    φ(0≠ρP←'proxy' XGET XML)/'FROM←P'
[14]    φ('<![CDATA['=9↑MSG←'blast' XGET XML)/'MSG←9↓¯3↓MSG'
[15]    SUBJ←'Shotgun',8↓CH
[16]    A SEND THE ALERT VIA THE SMTP SERVICE
[17]    P←MAIL FROM TO SUBJ MSG
[18]    A LOG THE EVENT IF REQUESTED BY THE USER
[19]    P←P,' (From: ',FROM,', To: 'TO,', Subject: ',SUBJ
[20]    φLF/'F LOG P,'', Message: '',MSG,'')'''
```

-continued

[21]    END:
        ∇ 2002-07-15 14.01.14 (GMT-4)
            ∇XGET[□]∇
[0]     Z←TAG XGET STRING
[1]     Z←2⊃('<',TAG,'>')('</',TAG,'>')EXTRACT STRING
        ∇ 2002-02-09 23.30.09 (GMT-4)
            ∇LOG [□]∇
[0]     F LOG D;RC
[1]     A SV100←((-(φF)L'\')↓F,'\NOW ',(DBLQUOTE∈D),'>>',F
[2]     A RC←SV100
[3]     F APPENDFILE∇⊂('[',(NICE_DATETIME □TS),'] '),∈D
        ∇ |2002-02-25 22.27.52 (GMT-4)
            ∇MATCH[□]∇
[0]     Z←STR MATCH PAT;I;□IO
[1]     A DOES STRING MATCH PATTERN (WITH ^AS WILDCARDS)?
[2]     □IO←0
[3]     LP:
[4]     A EXIT IF FIRST PART OF STRING DOES NOT MATCH
[5]     →(~Z←(I↑STR)≡(I←PAT⌊'^')↑PAT)/END
[6]     A PATTERN ENDS WITH WILDCARD AFTER MATCH SO FAR - OK
[7]     →(Z←(0=ρPAT←(I+1)↓PAT)^'^'=⁻1↑PAT)/END
[8]     A DONE IF EXACT MATCH OF REMAINING TEXT (NO OTHER ^)
[9]     →(Z←(0=ρSTR←I↓STR)^0=ρPAT)/END
[10]    A NO MATCH IF END OF STRING, BUT NOT END OF PATTERN
[11]    →(~Z←0≠ρSTR)/END
[12]    A NO MATCH IF ≠ STRING END & PATTERN END & NO END^
[13]    →(~Z←0≠ρPAT)/END
[14]    A DROP WILDCARD MATCHES, IF NOTHING LEFT, NO MATCH
[15]    →(~Z←0≠ρSTR←((((PAT⌊'^')↑PAT)⊆STR)⌊1)↓STR)/END
[16]    →LP
[17]    END:
        ∇ 2002-07-16 13.21.35 (GMT-4)
            ∇MAIL[□]∇
[0]     Z←MAIL ARGS;FROM;MSG;SUBJ;T;TO
[1]     A SEND MAIL VIA SMTP SERVER, ARGS: FROM TO SUBJ TEXT
[2]     A MAIL 'me@foo.com' 'ed@bar.com' 'Shotgun alert' 'Hi!'
[3]     (FROM TO SUBJ MSG)←ARGS
[4]     Z←'webservices.ibm.com/soap/servlet/rpcrouter'''
[5]     Z←Z, 'urn:BlueMail' 'simplesend' '' 10
[6]     T←'<myTo xsi:type="xsd:string">',TO,'</myTo>'
[7]     T←T, '<myFrom xsi:type="xsd:string">',FROM, '</myFrom>'
[8]     T←T, '<mySub xsi:type="xsd:string">',SUBJ, '</mySub>'
[9]     T←T, '<myMsg xsi:type="xsd:string">',MSG, '</myMsg>'
[10]    Z←Z SOAPWS T
[11]    T←'<return'
[12]    Z←(⁻1+(('</', 1↓T)⊆Z)⌊1)↑Z←(Z⌊'>')↓Z←((T⊆Z)⌊1) ↓Z
        ∇ 2002-07-16 13.26.23 (GMT-4)
            ∇SOAPWS[□]∇
[0]     XML_OUT←PARMS SOAPWS XML_IN;ENDPOINT;ACTION;NAMESPACE;
METHOD;IDPW;TIMEOUT;PROXY;USEPROXY;PORT;HOST;INDX;LEN;REQ;RC;
SOCK;VAR119; SOAP119
[1]     A ISSUE A WEB SERVICE REQUEST VIA SOAP HTTP INTERFACE
[2]     A PARMS: SOAP ENDPOINT URL, SOAP ACTION, NAMESPACE URI,
METHOD NAME, USERID:PW, TIMEOUT [,PROXY URL]
[3]     (ENDPOINT ACTION NAMESPACE METHOD IDPW TIMEOUT PROXY)
←7↑PARMS,⊂''
[4]     →(2≠RC←119 SVOFFER VAR119←'SOAP119')/ER
[5]     USEPROXY←0≠ρPROXY         A USING PROXY?
[6]     PORT←80                    A DEFAULT EP PORT NUMBER
[7]     →((ρHOST)<INDX←(HOST←(LEN←⁻1+ENDPOINT⌊'/')↑ENDPOINT)⌊
':')/NOPORT
[8]     PORT←'80' □EA INDX↓HOST     A EXTRACT EP PORT NUMBER
[9]     HOST←(INDX−1)↑HOST         A AND EP HOST DOMAIN NAME
[10]    NOPORT:
[11]    REQ←(HOST ACTION NAMESPACE METHOD IDPW)SOAPENV XML_IN
[12]    REQ←'POST ',(USEPROXY/'http://'),((LENx-USEPROXY)↓END
POINT),REQ
[13]    →(⁻1=↑RC←SOCK←GETSOCK '')/ER    A GET A SOCKET
[14]    →(⁻1=↑RC←BLOCKING SOCK 0)/ER    A NON-BLOCKING MODE
[15]    →(⁻1=↑RC←CONNECT SOCK(↑USEPROXYφPORT,80) (↑USEPROXYφHOST
PROXY))/ER
[16]    →((⁻1=↑RC)v~(,SOCK)≡2⊃RC←SELECT(,SOCK)'W' TIMEOUT)/ER
[17]    →(⁻1=↑RC←SENDALL SOCK REQ)/ER    A HTTP POST
[18]    LEN←ρXML_OUT←''           A INIT XML RESPONSE
[19]    RECVLOOP:
[20]    →((⁻1=↑RC)v~(,SOCK)≡1⊃RC←SELECT(,SOCK)'R' TIMEOUT)/ER
[21]    →(⁻1=↑RC←RECV SOCK)/ER     A READ NEXT CHUCK
[22]    XML_OUT←XML_OUT,RC         A ADD TO RESPONSE BUFF
[23]    →((LEN←ρXML_OUT)≠LEN)/RECVLOOP    A MORE TO RECEIVE?

-continued

```
[24]        →DISCON                 A COMPLETED, DISCONNECT
[25]      ER:
[26]        XML_OUT←RC              A RETURN ERROR CODES
[27]        →EXIT
[28]      DISCON:
[29]        RC←CLOSE SOCK           A CLOSE SOCKET
[30]      EXIT:
          ∇ |2002-07-16 13.50.03 (GMT-4)
            ∇SOAPENV[☐]∇
[0]       ENV←PARMS SOAPENV XML_IN;ACTION;HOST;IDPW;NAMESPACE;METHOD;
NL;XML
[1]       A GENERATE SOAP ENVELOPE FOR HTTP TRANSPORT
[2]       A PARMS: HOST, SOAP ACTION, NAMESPACE URI, METHOD NAME,
USERID:PW
[3]        (HOST ACTION NAMESPACE METHOD IDPW)←PARMS
[4]        NL←☐TC[☐IO+1 2]
[5]        XML←'<?xml version="1,0" encoding="UTF-8"?>'
[6]        XML←XML,'<SOAP-ENV:Envelope '
[7]        XML←XML,'xmlns:SOAP-ENV="http://schemas.xmlsoap.org/
soap/envelope/" '
[8]        XML←XML,'xmlns:xsi="http://www.w3.org/1999/XMLSchema-
instance" '
[9]        XML←XML,'xmlns:xsd="http://www.w3.org/1999/XMLSchema"
>'
[10]       XML←XML,'<SOAP-ENV:Body>'
[11]       XML←XML,'<ns1:',METHOD,' xmlns:ns1="',NAMESPACE,'" '
[12]       XML←XML,'SOAP-ENV:encodingStyle="http://schemas.xmlsoap.org/
soap/encoding/">'
[13]       XML←XML,XML_IN
[14]       XML←XML,'</ns1:',METHOD,'>'
[15]       XML←XML,'<SOAP-ENV:Body>'
[16]       XML←XML,'<SOAP-ENV:Envelope>'
[17]       ENV←' HTTP/1.0',NL
[18]       φ(0≠ρIDPW)/'ENV←ENV,"Authorization: Basic ",(BASE64_
ENCODE IDPW),NL'
[19]       ENV←ENV,'Host: ',HOST,NL
[20]       ENV←ENV,'Content-Type: text/xml; charset=utf-8',NL
[21]       ENV←ENV,'Content-Length: ',(φρXML),NL
[22]       ENV←ENV,'SOAPAction: "',ACTION,'"',NL
[23]       ENV←ENV,NL,XML
          ∇ 2001-12-11 23.16.19 (GMT-4)
            ∇BASE64_ENCODE[☐]∇
[0]       BASE64←SPLIT BASE64_ENCODE DATA;☐IO;AV64;BINARY
[1]       A Encode using MIME Content-Transfer-Encoding: Base64
as specified in RFC 2045.
[2]       A Arguments:  DATA - Network character data to be encoded
[3]       A             SPLIT - Whether result should be split in
to 76 byte records
[4]       A Result: Encoded data in network character representation
[5]        ☐IO←0
[6]        A☐ES(1<ρρDATA)/5 2      A Must be scalar or vector
[7]        A☐ES(255v,<☐AV[DATA)/5 4 A Must be single-byte character
[8]        →(0=ρDATA)/0 BASE64←' '
[9]        SPLIT←'0' ☐EA 'SPLIT'
[10]      A Encoding alphabet
[11]       AV64←'ABCDEFGHIJKLMNOPQRSTUVWXYZabcdefghijklmnopqrstu
vwxyz0123456789+/'
[12]      A Convert alphabet to network character representation
[13]       AV64←HTONC AV64
[14]      A Ensure data is a vector
[15]       DATA←,DATA
[16]      A Convert to bits
[17]       BINARY←'B1 1 ^ A RTA DATA
[18]      A Reshape to 6 column bit matrix
[19]       BINARY←((⌈(ρBINARY)÷6),6)ρBINARY,6ρ0
[20]      A Add two columns on the left
[21]       BINARY←(-0 2+ρBINARY)↑BINARY
[22]      A Convert to alphabet selections
[23]       BASE64←AV64[☐AF 'B1 1 ^ ATR,BINARY]
[24]      A Pad to multiple of 4 byte length
[25]       BASE64←(4×⌈(ρBASE64)÷4)↑BASE64,HTONC '==='
[26]       →(SPLIT=0)/0
[27]      A Partition into 76 byte records
[28]       BASE64←((ρBASE64)ρ(76↑2,75ρ1))⊂ BASE64
[29]      A Add carriage return line feeds
[30]       BASE64←∊BASE64,' '⊂HTONC ☐TC[1 2]
          ∇ 2002-07-16 13.52.53 (GMT-4)
```

The plugin capability of the present invention vastly extends the functionality of the present invention by permitting customized applications to perform function on incoming messages. It further allows the customized applications to interface with the shotgun application by way of a simple interface (API). In addition, the messages forwarded via the API to the customized application(s) use the powerful Channel and Filtering functions available to the Shotgun application.

While the preferred embodiment of the invention has been illustrated and described herein, it is to be understood that the invention is not limited to the precise construction herein disclosed, and the right is reserved to all changes and modifications coming within the scope of the invention as defined in the appended claims.

What is claimed is:

1. A method for presenting message topics to subscribers of a publish/subscribe service, the method comprising the steps of:

creating a GUI representation comprising one or more widgets and one or more topic identities, wherein the a first topic identity identifies a topic of messages to be published from a content provider by way of the publish/subscribe service to publish/subscribe subscribers;

associating a first list of first subscriber identities with the first topic identity, the first list of first subscriber identities identifying first subscribers subscribing to the first topic;

providing the first topic identity and associated first list of first subscribers to the pub/sub publish/subscribe service;

providing the GUI representation comprising the one or more widgets and the one or more topic identities to subscriber computer systems;

publishing topic messages of the first topic identity from the content provider by way of the publish/subscribe service to first subscribers according to the first list of first subscribers; and customizing published topic messages received from said publish/subscribe service at said subscriber computer system with predetermined inspection criteria set by said subscriber computer system by use of one of the widgets of said GUI representation at said subscriber computer system;

wherein the GUI representation further comprises a second topic identity comprising the further steps of:

associating a second list of second subscriber identities with the second topic identity, the second list of second subscriber identities identifying second subscribers subscribing to the second topic;

providing the second topic identity and associated second list of second subscribers to the publish/subscribe service;

publishing topic messages of the second topic identity from a content provider by way of the publish/subscribe service to second subscribers according to the second list of second subscribers;

receiving a request for a third subscriber to subscribe to the first topic represented by the first topic identity;

adding a third subscriber identity identifying the third subscriber to the first list of clients subscribing to the first topic;

said method comprising the further steps of receiving a first message, the first message to be published to the first subscribers of the first topic;

authorizing the publication of the first message to the first subscribers of the first topic; and publishing the first message to the first subscribers according to the first list of first identities; and wherein a GUI display comprising one or more subscriber identities in the first list of first identities persists until an event occurs comprising an elapsed time.

2. The method according to claim 1 wherein a widget of the one or more widgets includes any one of a topic activate function, a topic deactivate function, a topic active indicator, a function to cause details of a topic to be displayed, a function to request subscription to a topic, a function to add a topic, a function to remove a topic, a function to authorize subscription to a topic or a function to authorize the addition of a topic.

3. The method according to claim 1 comprising the further steps of:

receiving a widget message from a first subscriber computer system, the widget message initiated by a first subscriber GUI action associated with a first widget of the one or more widgets of the created GUI representation at the first subscriber computer system;

performing a function in response to the received widget message.

4. The method according to claim 3 wherein the function comprises a step including any one of:

activating a topic at the first subscriber computer system;

deactivating a topic at the first subscriber computer system;

indicating at the first subscriber computer system that a topic is active;

indicating at the first subscriber computer system that a topic is inactive;

displaying details of a topic at the first subscriber computer system;

granting subscription to a topic for the first subscriber;

adding a topic to the GUI representation at the first subscriber computer system;

removing a topic from the GUI representation at the first subscriber computer system; or authorizing a subscription to a topic or authorizing addition of a topic to the GUI representation.

5. The method according to claim 1 wherein the adding a third subscriber identity step further comprises a step including any one of:

authorizing the addition of the third subscriber; or authenticating the identity of the third subscriber.

6. The method according to claim 1 comprising the further steps of:

receiving a request to add a third topic to the GUI representation;

associating the third topic with a third list of subscriber identities; and adding the third topic to the GUI representation.

7. The method according to claim 1 wherein the GUI representation is presented to a subscriber by way of a subscriber computer application program.

8. The method according to claim 7 wherein the subscriber computer application program provides a step comprising any one of:

filtering of messages from the publish/subscribe service;

providing subscriber credentials to the publish/subscribe service; or providing an API interface for attaching agent applications.

9. The method according to claim 1 wherein the topic messages comprises any one of an XML file, an HTML, an instant message, an email message, a FAX message, a data file or an application program.

10. A computer product for presenting message topics to subscribers of a publish/subscribe service, the computer program product comprising:
  a storage medium readable by a processing circuit and storing instructions for execution by the processing circuit for performing a method comprising:
  creating a GUI representation comprising one or more widgets and one or more topic identities, wherein the a first topic identity identifies a topic of messages to be published from a content provider by way of the publish/subscribe service to publish/subscribe subscribers;
  associating a first list of first subscriber identities with the first topic identity, the first list of first subscriber identities identifying first subscribers subscribing to the first topic;
  providing the first topic identity and associated first list of first subscribers to the pub/sub publish/subscribe service;
  providing the GUI representation comprising the one or more widgets and the one or more topic identities to subscriber computer systems;
  publishing topic messages of the first topic identity from the content provider by way of the publish/subscribe service to first subscribers according to the first list of first subscribers; and
  customizing published topic messages received from said publish/subscribe service at said subscriber computer system with predetermined inspection criteria set by said subscriber computer system by use of one of the widgets of said GUI representation at said subscriber computer system;
  wherein the GUI representation further comprises a second topic identity comprising the further steps of:
  associating a second list of second subscriber identities with the second topic identity, the second list of second subscriber identities identifying second subscribers subscribing to the second topic;
  providing the second topic identity and associated second list of second subscribers to the publish/subscribe service;
  publishing topic messages of the second topic identity from a content provider by way of the publish/subscribe service to second subscribers according to the second list of second subscribers;
  receiving a request for a third subscriber to subscribe to the first topic represented by the first topic identity;
  adding a third subscriber identity identifying the third subscriber to the first list of clients subscribing to the first topic;
  said method comprising the further steps of receiving a first message, the first message to be published to the first subscribers of the first topic;
  authorizing the publication of the first message to the first subscribers of the first topic; and
  publishing the first message to the first subscribers according to the first list of first identities; and
  wherein a GUI display comprising one or more subscriber identities in the first list of first identities persists until an event occurs comprising an elapsed time.

11. The computer product according to claim 10 wherein a widget of the one or more widgets including of any one of a topic activate function, a topic deactivate function, a topic active indicator, a function to cause details of a topic to be displayed, a function to request subscription to a topic, a function to add a topic, a function to remove a topic, a function to authorize subscription to a topic or a function to authorize the addition of a topic.

12. The computer product according to claim 10 wherein said method further comprises the further steps of:
  receiving a widget message from a first subscriber computer system, the widget message initiated by a first subscriber GUI action associated with a first widget of the one or more widgets of the created GUI representation at the first subscriber computer system; and
  performing a function in response to the received widget message.

13. The computer product according to claim 12 wherein the function comprises a step including any one of:
  activating a topic at the first subscriber computer system;
  deactivating a topic at the first subscriber computer system;
  indicating at the first subscriber computer system that a topic is active;
  indicating at the first subscriber computer system that a topic is inactive;
  displaying details of a topic at the first subscriber computer system;
  granting subscription to a topic for the first subscriber;
  adding a topic to the GUI representation at the first subscriber computer system;
  removing a topic from the GUI representation at the first subscriber computer system; or
  authorizing a subscription to a topic or authorizing addition of a topic to the GUI representation.

14. The computer product according to claim 10 wherein the adding a third subscriber identity step further comprises a step including any one of:
  authorizing the addition of the third subscriber; or
  authenticating the identity of the third subscriber.

15. The computer product according to claim 10 wherein said method comprises the further steps of:
  receiving a request to add a third topic to the GUI representation;
  associating the third topic with a third list of subscriber identities; and
  adding the third topic to the GUI representation.

16. The computer product according to claim 10 wherein the GUI representation is presented to a subscriber by way of a subscriber computer application program.

17. The computer product according to claim 16 wherein the subscriber computer application program provides a step comprising any one of:
  filtering of messages from the publish/subscribe service;
  providing subscriber credentials to the publish/subscribe service; or
  providing an API interface for attaching agent applications.

18. The computer product according to claim 10 wherein the topic messages comprising any one of an XML file, an HTML, an instant message, an email message, a FAX message, a data file or an application program.

19. The system according to claim 10 wherein the topic messages comprises any one of an XML file, an HTML, an instant message, an email message, a FAX message, a data file or an application program.

20. A system for presenting message topics to subscribers of a publish/subscribe service, the system comprising:
  a network;
  a client system in communication with the network;
  a publish/subscribe service in communication with the network, wherein the system includes instructions to execute a method comprising the steps of:
  creating a GUI representation comprising one or more widgets and one or more topic identities, wherein the a first topic identity identifies a topic of messages to be published from a content provider by way of the publish/subscribe service to publish/subscribe subscribers;

associating a first list of first subscriber identities with the first topic identity, the first list of first subscriber identities identifying first subscribers subscribing to the first topic;

providing the first topic identity and associated first list of first subscribers to the pub/sub publish/subscribe service;

providing the GUI representation comprising the one or more widgets and the one or more topic identities to subscriber computer systems;

publishing topic messages of the first topic identity from the content provider by way of the publish/subscribe service to first subscribers according to the first list of first subscribers; and customizing published topic messages received from said publish/subscribe service at said subscriber computer system with predetermined inspection criteria set by said subscriber computer system by use of one of the widgets of said GUI representation at said subscriber computer system;

wherein the GUI representation further comprises a second topic identity comprising the further steps of:

associating a second list of second subscriber identities with the second topic identity, the second list of second subscriber identities identifying second subscribers subscribing to the second topic;

providing the second topic identity and associated second list of second subscribers to the publish/subscribe service;

publishing topic messages of the second topic identity from a content provider by way of the publish/subscribe service to second subscribers according to the second list of second subscribers;

receiving a request for a third subscriber to subscribe to the first topic represented by the first topic identity;

adding a third subscriber identity identifying the third subscriber to the first list of clients subscribing to the first topic;

said method comprising the further steps of receiving a first message, the first message to be published to the first subscribers of the first topic;

authorizing the publication of the first message to the first subscribers of the first topic; and publishing the first message to the first subscribers according to the first list of first identities; and wherein a GUI display comprising one or more subscriber identities in the first list of first identities persists until an event occurs comprising an elapsed time.

21. The system according to claim 20 wherein a widget of the one or more widgets includes any one of a topic activate function, a topic deactivate function, a topic active indicator, a function to cause details of a topic to be displayed, a function to request subscription to a topic, a function to add a topic, a function to remove a topic, a function to authorize subscription to a topic or a function to authorize the addition of a topic.

22. The system according to claim 20 wherein said method further comprises the steps of:

receiving a widget message from a first subscriber computer system, the widget message initiated by a first subscriber GUI action associated with a first widget of the one or more widgets of the created GUI representation at the first subscriber computer system; and performing a function in response to the received widget message.

23. The system according to claim 22 wherein the function comprises a step of any one of:

activating a topic at the first subscriber computer system;

deactivating a topic at the first subscriber computer system;

indicating at the first subscriber computer system that a topic is active;

indicating at the first subscriber computer system that a topic is inactive;

displaying details of a topic at the first subscriber computer system;

granting subscription to a topic for the first subscriber;

adding a topic to the GUI representation at the first subscriber computer system;

removing a topic from the GUI representation at the first subscriber computer system; or authorizing a subscription to a topic or authorizing addition of a topic to the GUI representation.

24. The system according to claim 20 wherein the adding a third subscriber identity step further comprises a step of any one of:

authorizing the addition of the third subscriber; or authenticating the identity of the third subscriber.

25. The system according to claim 20 wherein said method comprises the further steps of:

receiving a request to add a third topic to the GUI representation;

associating the third topic with a third list of subscriber identities; and adding the third topic to the GUI representation.

26. The system according to claim 20 wherein the GUI representation is presented to a subscriber by way of a subscriber computer application program.

27. The system according to claim 26 wherein the subscriber computer application program provides a step comprising of any one of:

filtering of messages from the publish/subscribe service;

providing subscriber credentials to the publish/subscribe service; or providing an API interface for attaching agent applications.

* * * * *